(12) United States Patent
Seo et al.

(10) Patent No.: US 7,580,480 B2
(45) Date of Patent: Aug. 25, 2009

(54) DEMODULATION METHOD USING SOFT DECISION FOR QUADRATURE AMPLITUDE MODULATION AND APPARATUS THEREOF

(75) Inventors: Hong-Seok Seo, 403-605 Maehwamaeul-jugong Apt., 211 Yatap-dong, Bungdang-gu, 463-070 Seongnam (KR); Tae-Hoon Kim, Seoul (KR)

(73) Assignee: Hong-Seok Seo, Seongnam (KR)

( * ) Notice: Subject to any disclaimer, the term of this patent is extended or adjusted under 35 U.S.C. 154(b) by 623 days.

(21) Appl. No.: 10/536,756

(22) PCT Filed: Jan. 10, 2004

(86) PCT No.: PCT/KR2004/000032

§ 371 (c)(1),
(2), (4) Date: May 27, 2005

(87) PCT Pub. No.: WO2004/114616

PCT Pub. Date: Dec. 29, 2004

(65) Prior Publication Data

US 2006/0034392 A1    Feb. 16, 2006

(30) Foreign Application Priority Data

Jun. 23, 2003  (KR) .................. 10-2003-0040902
Jan. 6, 2004   (KR) .................. 10-2004-0000800

(51) Int. Cl.
H04L 27/00   (2006.01)
H03D 3/00    (2006.01)
H03K 9/00    (2006.01)

(52) U.S. Cl. .................. 375/324; 375/322; 375/316

(58) Field of Classification Search .................. 375/324, 375/322, 316

See application file for complete search history.

(56) References Cited

U.S. PATENT DOCUMENTS

| 6,038,696 | A  |    | 3/2000  | Chouly et al.        |
|-----------|----|----|---------|----------------------|
| 6,507,619 | B1 | *  | 1/2003  | Thomson et al. ............ 375/241 |
| 6,834,088 | B2 |    | 12/2004 | Agami et al.         |
| 2004/0096007 | A1 | | 5/2004  | Aue et al.           |
| 2004/0136313 | A1 | | 7/2004  | Goldstein et al.     |

FOREIGN PATENT DOCUMENTS

| KR | 1020030014872 | 2/2003 |
| KR | 1020030027233 | 4/2003 |
| WO | WO 01/67617   | 9/2001 |
| WO | WO 03/007529  | 1/2003 |

* cited by examiner

*Primary Examiner*—Chieh M Fan
*Assistant Examiner*—Brian J Stevens
(74) *Attorney, Agent, or Firm*—Rabin & Berdo, P.C.

(57) ABSTRACT

In a soft decision method for demodulation of a received square QAM (Quadrature Amplitude Modulation) signal, the processing speed is improved, and the manufacturing expense is reduced, by using condition probability vector values, which are soft decision values. A condition judgment operation is employed.

29 Claims, 9 Drawing Sheets

FIG. 1 PRIOR ART
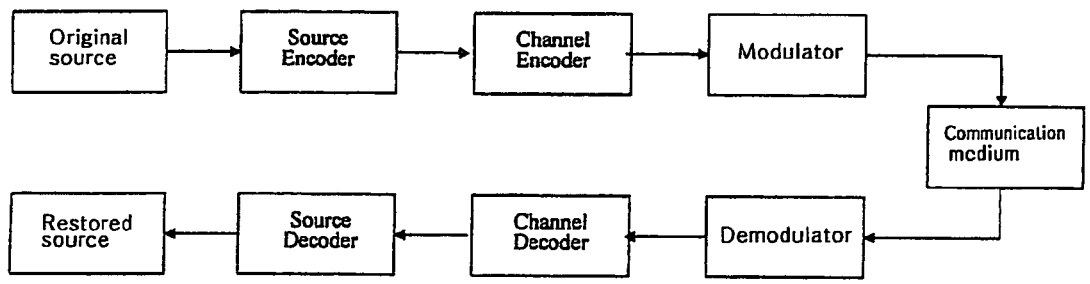
FIG. 2
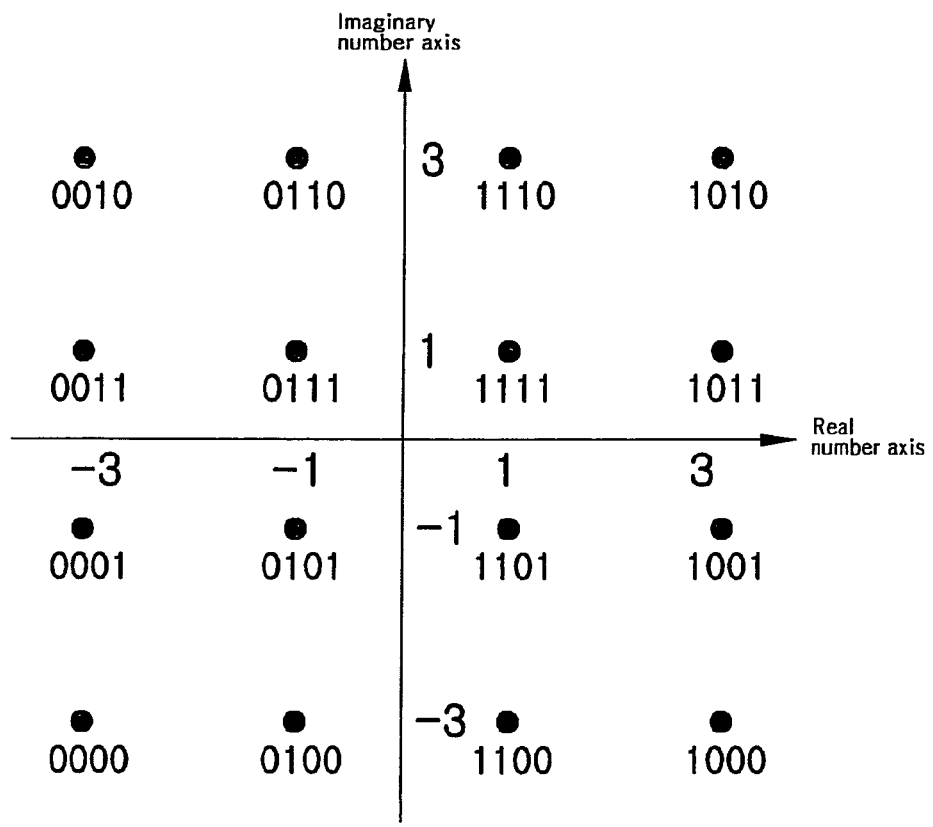

First bit    Second bit

Third bit    Fourth bit

DEMODULATION METHOD USING SOFT DECISION FOR QUADRATURE AMPLITUDE MODULATION AND APPARATUS THEREOF

TECHNICAL FIELD

The present invention relates to a soft decision demodulation technique for a Quadrature Amplitude Modulation (hereinafter, referred to as QAM) signal, and more particularly, to a soft decision demodulation method capable of enhancing the processing speed of soft decision demodulation.

BACKGROUND ART

The QAM scheme is capable of transmissions loading two or more bits onto a given waveform symbol, whose waveform can be mathematically expressed in two real numbers and imaginary numbers that do not interfere with each other. That is, in the complex number imaginary number $\alpha+\beta i$, a change of the value a does not affect the value $\beta$. Due to that reason, a quadrature signal component can correspond to $\alpha$, and an in-phase signal component can correspond to $\beta$. Generally, the quadrature signal component is referred to as the Q-channel, and the in-phase component signal is referred to as the I-channel.

A constellation diagram of QAM plots the amplitudes of such two waves with respect to each other so as to make a-number of combinations. The positions of the combinations on a complex number plane should have an equal conditional probability. FIG. 2 is a diagram showing an example of such a constellation diagram, whose size is 16 combinations. Also, each of the points shown in FIG. 2 is referred to as a constellation point. Also, the binary number written under each constellation point represent the symbol assigned to that point, that is, a bundle of bits.

Generally, a QAM demodulator serves to convert signals incoming on an I channel and an Q channel, that is, a received signal given as $\alpha+\beta i$, into the original bit bundle according to the constellation points mentioned above, that is, the constellation diagram. However, the received signals may not be positioned on places assigned previously, in most cases due to the effect of noise interference, and accordingly the demodulator has to restore the signals that have been converted due to noise. Since it is often desirable to guarantee the reliability of communication in that the demodulator takes charge of the role of noise cancellation, it is possible to embody a more effective and reliable communication system by rendering the role to the next step of a channel decoder. However, since there is an information loss in a bit quantization process performed by a binary bit detector as in a hard decision by converting a demodulation signal having a continuous value to corresponding discrete signals of 2 levels in order to perform such a process, a similarity measure with respect to the distance between a received signal and the constellation point is changed from a Hamming distance to a Euclidean distance without using the binary, bit detector, so that an additional gain can be obtained.

As shown in FIG. 1, in order to modulate and transmit a signal encoded by a channel encoder and demodulate the signal in a channel demodulator through a hard decision coding process, the demodulator has to have a scheme for generating the hard decision values corresponding to each of the output bits of a channel encoder from a receiving signal consisted of an in-phase signal component and a quadrature phase signal component. Such scheme generally includes two procedures, that is, a simple metric procedure proposed by Nokia company and a dual minimum metric procedure proposed by Motorola, both procedures calculating LLR (Log Likelihood Ratio) with respect to each of the output bits and using it as an input soft decision value of the channel demodulator.

The simple metric procedure is an event algorithm that transforms a complicated LLR calculation equation to a simple form of an approximation equation, which has a degradation of performance due to an LLR distortion caused by using the approximation equation even though it makes the LLR calculation simple. On the other hand, the dual minimum metric procedure is an event algorithm that uses the LLR calculated using a more precise approximation equation as an input of the channel demodulator, which has the merit of considerably improving the degradation of performance caused in the case of using the simple metric procedure, but it has an expected problem that more calculations are needed compared with the simple metric procedure and an its complication is considerably increased upon embodying hardware.

DISCLOSURE OF THE INVENTION

Therefore, an object of the present invention is to solve the problems involved in the prior art, and to provide a soft decision scheme for demodulating a received Quadrature Amplitude Modulation (QAM) signal consisting of an in-phase signal component and an quadrature phase signal component, where a conditional probability vector value (a soft decision value corresponding to a bit position of a hard, decision) can be obtained using a function including a conditional determination calculation from a quadrature phase component value and an in-phase component value of the received signal, and so it is expected that processing rate can be improved and the real manufacturing cost of hardware can be reduced. In order to perform such a procedure, first, a known form of a combinational constellation diagram of QAM and its characteristic demodulation scheme will be described as follows. The combinational constellation diagram of QAM may be generally divided into 3 types or forms according to the arrangement of bit bundles assigned to the constellation points. The first form is a form with a constellation as shown in FIGS. 2 to 4, the second is a form with a constellation as shown in FIGS. 5 to 7, and the third is a form that is not included in this application.

A characteristic of the form or case shown in FIG. 2 can be summarized as follows. In the case where the magnitude of the QAM is $2^{2n}$, the number of bits assigned to each constellation point becomes 2n, and conditional probability vector values corresponding to the first half of the number (that is, the first to $n^{th}$ bits) are demodulated by one of the received signals $\alpha$ and $\beta$ and the conditional probability vector values corresponding to the second half of the number (that is, the $(n+1)^{th}$ to the $2n^{th}$ bits) are demodulated by the remaining one receiving signal. Also, an equation that is applied to both demodulations has the same procedure in the first half and second half demodulations. That is, when the value of received signal corresponding to the second half is substituted in the first half demodulation method, the result of the second half can be obtained. (Hereinafter, such form is referred to as 'the first form').

The characteristic of the form shown in FIG. 5 can be summarized as follows. In the case where the magnitude of the QAM is $2^{2n}$, the number of the bits assigned to each of the constellation points becomes 2n, and the demodulation method of the conditional probability vector corresponding to an odd-ordered bit is the same as the calculation method of the conditional probability vector corresponding to the next even-ordered bit. However, the received signal value used to calculate the conditional probability vector corresponding to the odd-ordered bit uses one of α and β according to a given combination constellation diagram and the received signal value for the even-ordered bit is used for the remaining one. In other words, in the cases of the first and second conditional probability vector calculations, they use the same demodulation method but the values of the receiving signals are different. (Hereinafter, such form is referred to as 'the second form').

BRIEF DESCRIPTION OF THE DRAWINGS

The above objects, other features and advantages of the present invention will become more apparent by describing the preferred embodiment thereof with reference to the accompanying drawings, in which:

FIG. 1 is a block diagram for explaining a general digital communication system;

FIG. 2 is a view showing a combination constellation diagram for explaining a soft decision demodulation method in accordance with a first embodiment of the present invention;

BEST MODE FOR CARRYING OUT THE INVENTION

Reference will now be made in detail to preferred embodiments of the present invention, examples of which are illustrated in the accompanying drawings.

The present invention remarkably improves the processing speed by applying a conditional probability vector equation instead of a log likelihood ratio method, being a soft decision demodulation method of a square constellation QAM signals that is generally used in the industry.

The newly developed demodulation method of a square QAM signal is divided into 2 forms (see the "Disclosure of the Invention" section, above), and first and third embodiments are used for the first form and second and fourth embodiments are used for the second form. Also, an output of the final conditional probability vector value covers an area between a real number "a" and another real number "−a".

First, several basic prerequisites will be explained before entering into the description. The magnitude of the QAM can be characterized by the mathematical expression 1 and accordingly the number of bits assigned to each point of the constellation diagram can be characterized by the mathematical expression 2.

Mathematical Expression 1

$$2^{2n}\text{-QAM}.\ n=2,3,4\ldots$$

Mathematical Expression 2

$$\text{the number of bits set in each point}=2^{2n}$$

Accordingly, the number of the conditional probability vector values, being the final output values, also becomes 2n.

Now, a first embodiment for demodulating a square constellation QAM signals of the present invention will be explained.

First, a soft decision method for a received signal in a system using a square QAM signal constellation corresponding to the first form will be explained. In the case of the first form, although it was mentioned that one of the values of the quadrature phase component (real number part or α) or the in-phase signal component (imaginary number part or β) is used to calculate the conditional probability vector corresponding to the first half bit combination when explaining the characteristic of the first form were explained, the first half and the second half demodulation using the value β and value α respectively, for the convenience of understanding an output area according to the demodulation is set as a value between 1 and −1 for the sake of convenience in the following description. Also, k is used as a parameter indicating the order of each bit.

Figure 5:
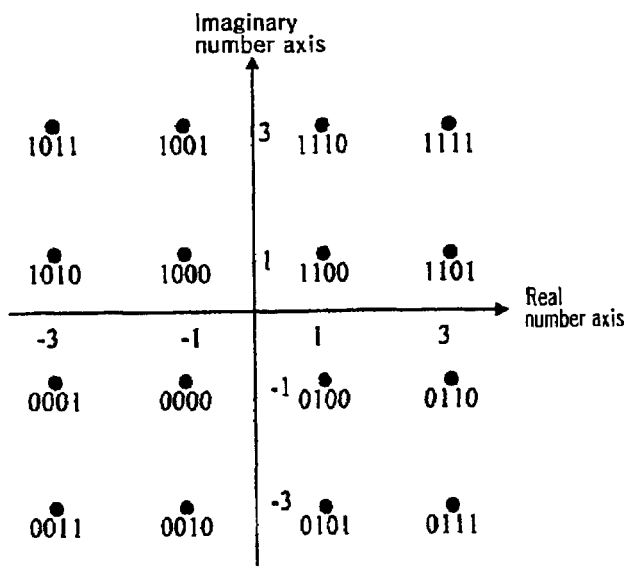
FIG. 5 is a view showing a combination constellation diagram for explaining a soft decision demodulation method in accordance with a second embodiment of the present invention.

A method for calculating a conditional probability vector corresponding to the case where the first bit ( that is, k is 1 ) in the first form can be expressed as a mathematical expression 3, and FIG. 5 is a visualization of it.

Mathematical Expression 3

In the case of the first conditional probability vector (k=1), output value is determined as $$\frac{1}{2^n}\beta.$$

However, the value of n is determined by the magnitude of QAM using the mathematical expression 1.

Figure 6:
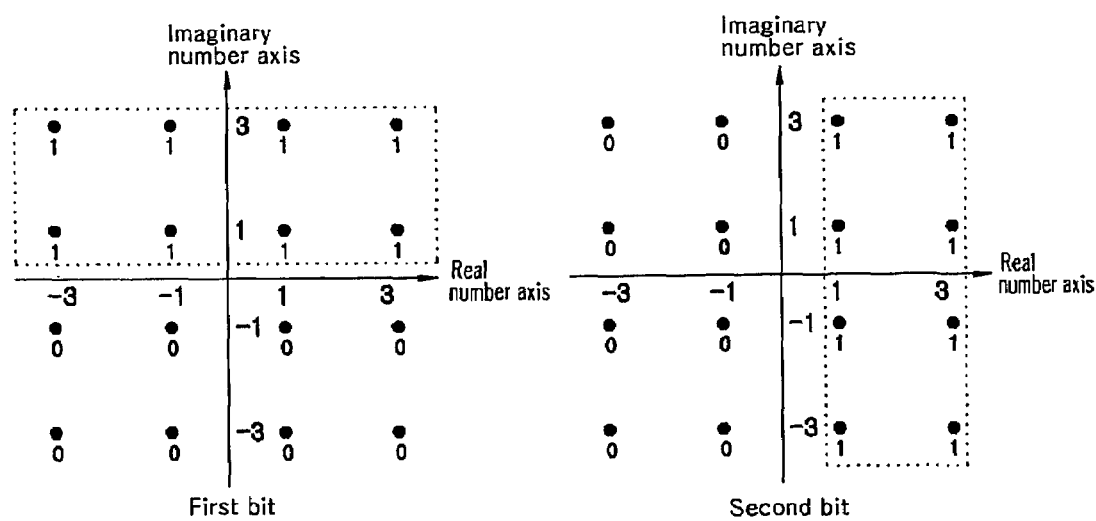
FIGS. 6 and 7 are views for explaining bit patterns in the combination constellation diagram shown in FIG. 5.
Figure 7:
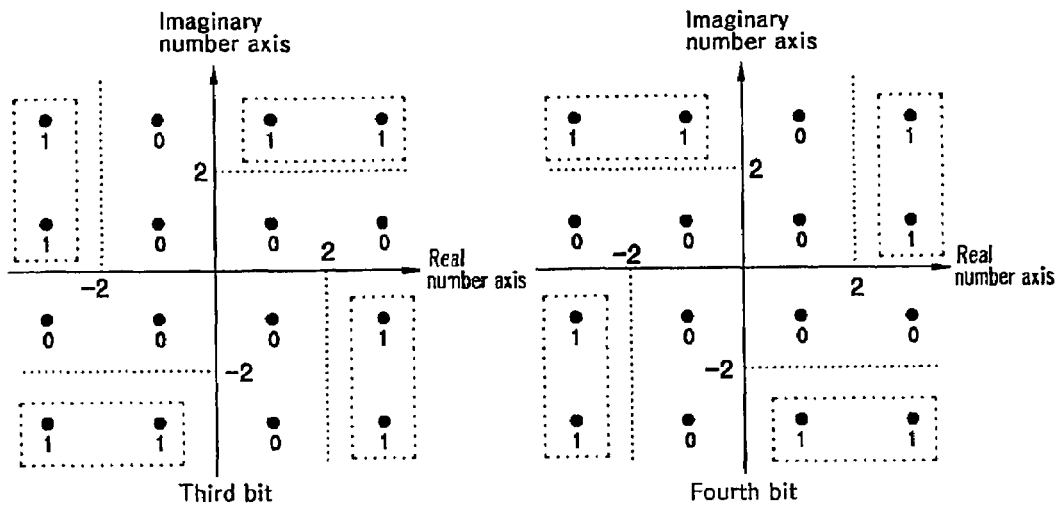
Figure 8:
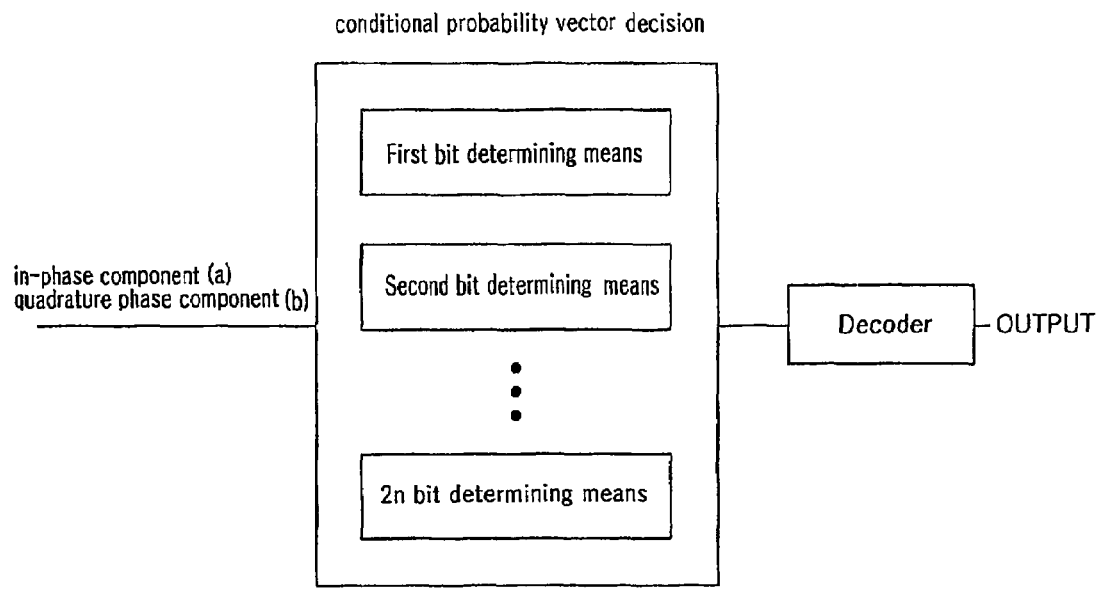
FIG. 8 is a view showing a conditional probability vector decision procedure in accordance with the present invention as a functional block.

A method for calculating the conditional probability vector corresponding to the second bit (k=2) in the first form can be expressed by a mathematical expression 4, and FIG. 6 is a visualization of it.

Mathematical Expression 4

In the case of the second conditional probability vector (k=2), the output value is unconditionally determined as $$c-\frac{c}{2^{n-1}}|\beta|.$$

Here, n is a magnitude parameter of the QAM in the mathematical expression 1, and c is a constant.

Figure 9:
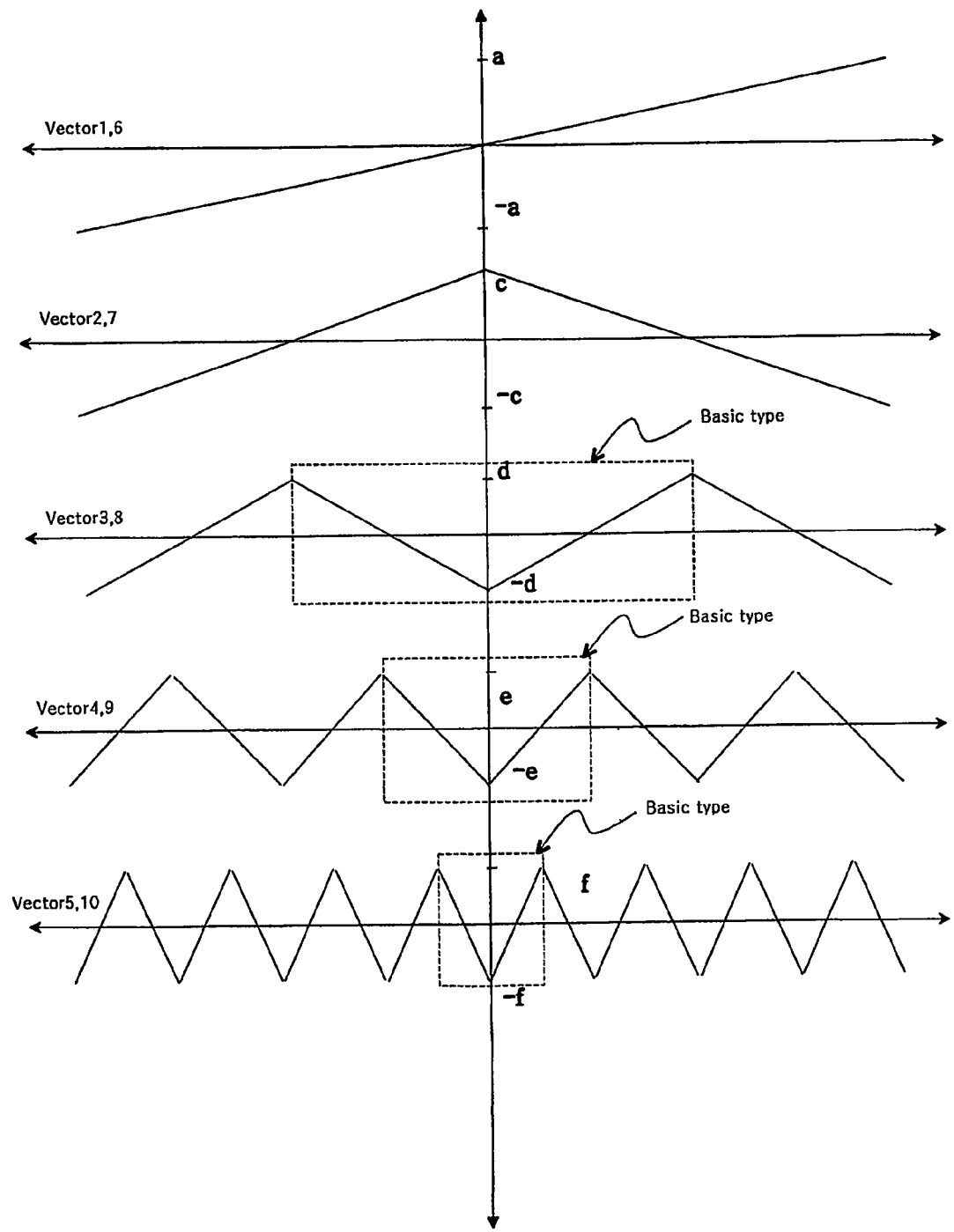
FIG. 9 is an output diagram with respect to each conditional probability vector of a first form of 1024-QAM.

A method for calculating a conditional probability vector corresponding to a third bit to $n^{th}$ bit (k=3, 4, . . . , n−1, n) in the first form can be expressed as a mathematical expression 5. Here, as can be seen from FIG. 9, since the conditional probability vector corresponding to the third or later bit indicates a determined iteration (v shape) form, it is noted that an expression be repeatedly used using such property.

Mathematical Expression 5

First, dividing the output diagram with a basic v-shaped form, the conditional probability vector corresponding to each bit is divided into ($2^{k-3}+1$) areas.

②A basic expression according to the basic form is determined as $$\frac{d}{2^{n-k+1}}|\beta|-d.$$

③ If finding a belonging area as the given β and substituting a value of $|\beta|-m$ that is subtracted a middle value m of each area (for example, since the repeated area is one when k=4, the area becomes $2^{n-2} \leq |\beta| < 3 \cdot 2^{n-2}$ and the middle value becomes $m=2^{n-1}$) into the basic expression as a new β, the output value can be determined.

④ Finally, in the left and right outer areas among the divided areas, that is, $(2^{k-2}-1)2^{n-k+2}<|\beta|$, the output value can be determined by substituting the middle value of $m=2^n$ and ($|\beta|-m$) value of a new β into the basic expression.

Here, d is a constant that is changed according to a value of k.

A method for calculating the conditional probability vector corresponding to the second half bits of the first form, that is, bit number n+1 to 2n can be obtained by substituting the β into α in the method for obtaining the conditional probability vector of the first half according to the characteristic of the first form. In other word, the condition that all of β in the mathematical expression 3 are substituted with α becomes a calculation expression of the first conditional probability vector of the second half, that is, a conditional probability vector corresponding to $(n+1)^{th}$ bit. The conditional probability vector corresponding to the $(n+2)^{th}$ bit of the second conditional probability vector of the second half can be determined by substituting β with α in the mathematical expression (4 that is, the condition to calculate the second conditional probability vector of the first half), and the conditional probability vector corresponding to the bit number n+3 to 2n being the next case can be determined by transforming the mathematical expression to the above description.

Next, a method for performing soft decisions of the received signal in a system using a square QAM constellation corresponding to the second form will be explained. For convenience of understanding, demodulation is performed to determine the conditional probability vector corresponding to odd-ordered bits using the value of α and to determine the conditional probability vector corresponding to even-ordered bits using the value of β, and accordingly the output scope is determined between 1 and −1 as is in the first form for convenience' sake.

In the second form, a method for calculating the conditional probability vector corresponding to the first bit (k=1) can be expressed as a mathematical expression 6 and FIG. 6 is a visualization of it.

Mathematical Expression 6

ⓐ In the case of the first bit (k=1), the output value is determined as $$-\frac{1}{2^2}\alpha.$$

However, the value of n is determined by the mathematical expression 1 according to the magnitude of the QAM.

In the second form, the conditional probability vector corresponding to the second bit (k=2) can be obtained by substituting the α with β in the mathematical expression 6 for calculating the first conditional probability vector according to the characteristic of the second form.

In the second form, a method for calculating the conditional probability vector corresponding to the third bit (k=3) can be expressed as a mathematical expression 7.

Mathematical Expression 7

If $\alpha \cdot \beta \geq 0$,

ⓐ In the case of the third bit (k=3), the output value is determined as $$\frac{c}{2^{n-1}}|\alpha|-c.$$

If $\alpha \cdot \beta < 0$, the calculation expression is determined as an expression in which all of α are substituted with β in the calculation expression in the case of $\alpha \cdot \beta \geq 0$.

Here, n is a magnitude parameter of the QAM in the mathematical expression 1 and c is a constant.

As such, it can be another characteristic of the second form QAM that the conditional probability vector is obtained in the cases of $\alpha \cdot \beta \geq 0$ and $\alpha \cdot \beta < 0$ separately. Such characteristic is applied when the conditional probability vector corresponding to the third or later bit of the second form and includes a reciprocal substitution characteristic like substituting β with α.

An expression to obtain the conditional probability vector corresponding to the fourth bit (k=4) of the second form can be obtained by substituting α with β and β with α in the mathematical expression 7 used to obtain the third conditional probability vector according to the second form.

Figure 10:
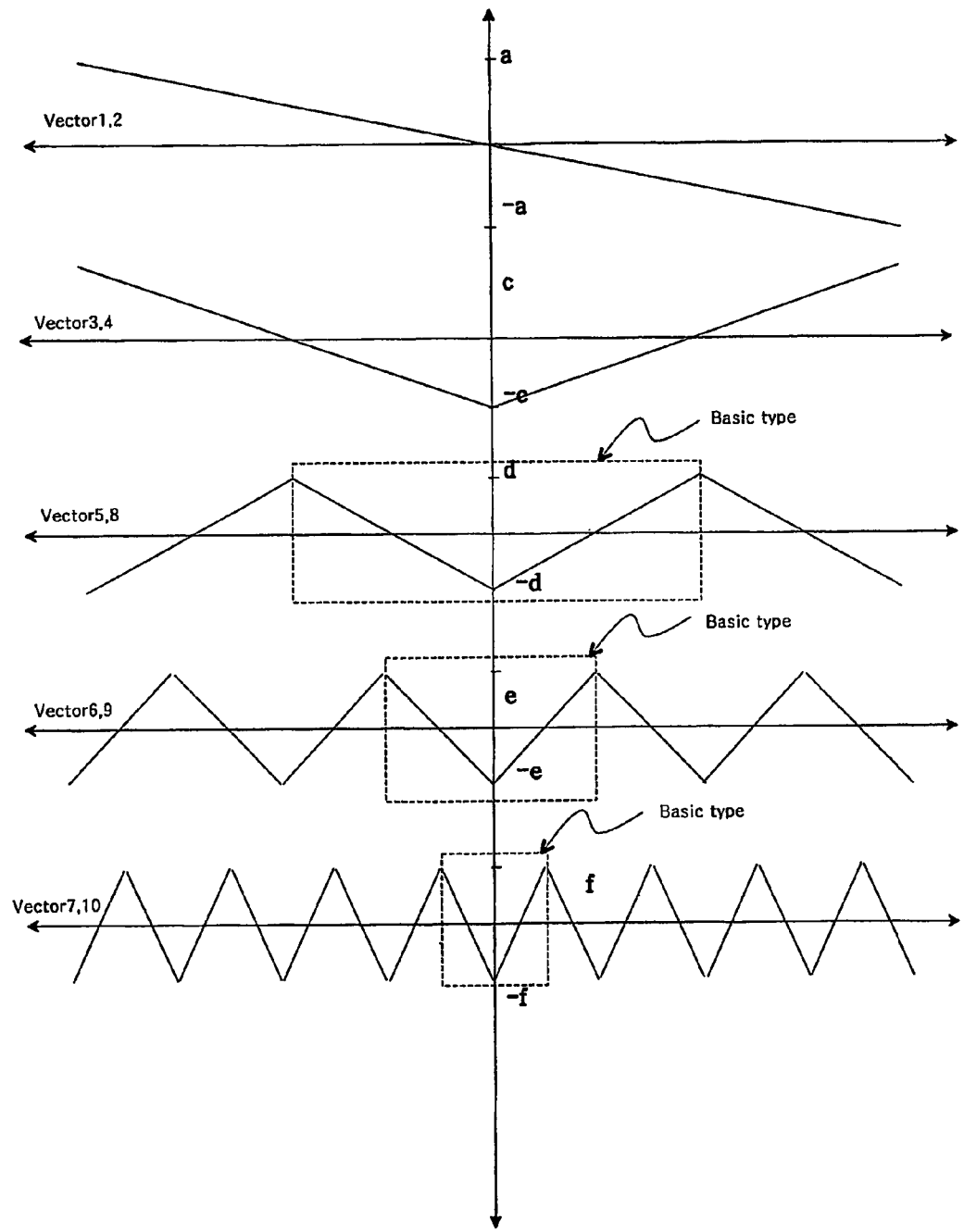
FIG. 10 is an output diagram with respect to each conditional probability vector of a second form of 1024-QAM.

The expression used to obtain the conditional probability vector corresponding to the fifth bit (k=5) of the second form can be obtained by applying the mathematical expression 8. Here, as can be seen from FIG. 10, since the conditional probability vector corresponding to the fifth or later bit indicates a v shape form, it is noted that an expression be repeatedly used using such property. However, when the conditional probability vector corresponding to the fifth or later bit is calculated, the even-ordered determination value uses the expression that was used to calculate just before odd-ordered determination value according to the property of the second form, which is applied when the magnitude of the QAM is less than 64 only. And, when the magnitude is over 256, the remaining part can be divided into two parts and the calculation can be performed in the first half part and then in the second half part as is in the first form.

Mathematical Expression 8

If $\alpha \cdot \beta \geq 0$,

ⓐ First, on dividing the output diagram into a basic V-shaped form, the conditional probability vector corresponding to each bit can be divided into ($2^{k-5}+1$) areas.

ⓑ A basic expression according to a basic form is determined as $$\frac{d}{2^{n-k+3}}|\alpha|-d.$$

(c) If finding a belonging area as the given α and substituting a value of |α|−m that is subtracted a middle value m of each area (for example, since the repeated area is one when k=6, the area becomes $2^{n-2} \leq |\alpha| < 3 \cdot 2^{n-2}$ and the middle value becomes $m=2^{n-1}$) into the basic expression as a new α, the output value can be determined.

(d) Finally, in the left and right outer area among the divided areas, that is, $(2^{k-2}-1)2^{n-k+2} < |\alpha|$, the output value can be determined by substituting the middle value of $m=2^n$ and (|α|−m) value of a new β into the basic expression.

In the case of α·β<0, the output value can be obtained by substituting α with β in the expressions (a), (b), (c) and (d).

The calculation of the conditional probability vector corresponding to the sixth bit of the second form can be obtained by substituting α with β and β with α in the mathematical expression 8 used to obtain the fifth conditional probability vector by the property of the second form in the case that the magnitude of the QAM is 64-QAM. However, in the case that the magnitude of the QAM is more than 256-QAM, the first half is obtained by dividing total remaining vectors into 2 and the second half is obtained by substituting the received value (α and β) into the expression of first half. At this time, changed value in the expression of first half is the received value only, and the bit number value (k) is not changed but substituted with that of first half.

Consequently, in the case that the magnitude of the QAM is more than 256, the calculation of the conditional probability vector corresponding to the fifth to $(n+2)^{th}$ bit of the second half is determined by the mathematical expression 8.

The calculation of the conditional probability vector corresponding to the (n+3)th to the last, 2nth bit of the second form is determined by substituting the parameter α with β in the mathematical expression as mentioned above.

The soft decision demodulation of the square QAM can be performed using the received signal, that is, α+βi through the procedure described above. However, it is noted that although the method described above arbitrarily determined an order in selecting the received signal and substituting it into a determination expression for convenience of understanding, the method is applied more generally in real applications so that the character α or β expressed in the mathematical expressions can be freely exchanged each other according to the combination constellation form of the QAM, and the scope of the output values may be nonsymmetrical such as values between a and b, as well as values between a and −a. This fact enlarges the generality of the present invention, so that it increases its significance. Also, although the mathematical expressions described above seems to be very complicated, they are generalized for general applications so that it is realized that they are very simple viewing them through applied embodiments.

FIRST EMBODIMENT

The first embodiment of the present invention is a case corresponding to the first form. The first embodiment includes an example of 1024-QAM where the magnitude of QAM is 1024. The order selection of the received signal is intended to apply α in the first half and β in the second half.

Basically, QAM in two embodiments of the present invention can be determined as in the following expression. A mathematical expression 1 determines the magnitude of QAM and a mathematical expression 2 shows the number of bits set in each point of a combination constellation diagram according to the magnitude of QAM.

Mathematical Expression 1

$2^{2n}$-QAM, n=2, 3, 4 . . .

Mathematical Expression 2 the number of bits set in each point=2n

Basically, the magnitude of QAM in the first embodiment of the present invention is determined as the following expression, and accordingly the conditional probability vector value of the final output value becomes 2n.

A case where $2^{2*5}$-QAM equals to 1024-QAM according to the mathematical expression 1 and the number of bits set in each constellation point equals to 2×5=10 bits according to the mathematical expression 2 will be explained using such mathematical expressions 1 and 2. First, prior to entering into calculation expression applications, it is noted that if a calculation expression for 5 bits of the first half among 10 bits are known by the property of the first form, a calculation expression for remaining 5 bits of the second half is also known directly.

First, the first conditional probability vector expression is a case of k=1, and has its output value determined as $$\frac{1}{2^5}\beta$$

unconditionally.

Next, the second (that is, k=2) conditional probability vector has its output value of $$c - \frac{c}{2^4}|\beta|.$$

Here, c is a constant.

Next, the third (k=3) conditional probability vector calculation expression is given as follows, where the basic expression according to the basic form is determined as $$\frac{d}{2^3}|\beta|-d.$$

At this time, the calculation is divided into 2 areas, and the output value is determined as $$\frac{d}{2^3}|\beta|-d$$

if $|\beta|<2^4$, and the output value is determined as $$\frac{d}{2^3}||\beta|-32|-d$$

for the other cases.

Next, the fourth (k=4) conditional probability vector calculation expression is given as follows, where the basic expression according to the basic form is determined as $$\frac{d}{2^2}|\beta|-d$$

and divided into 3 areas.

Here, the output value is determined as $$\frac{d}{2^2}|\beta|-d$$

if $|\beta|<2^3$, the output value is determined as $$\frac{d}{2^2}||\beta|-16|-d$$

if $2^3 \leq |\beta|<3 \cdot 2^3$, and the output value is determined as $$\frac{d}{2^2}||\beta|-32|-d$$

for the other case.

Next, the calculation expression of the fifth (k=5) conditional probability vector is given as follows, where a basic expression according to the basic expression is determined as $$\frac{d}{2}|\beta|-d$$

and is divided into 5 areas. Here, the output value is determined as $$\frac{d}{2}|\beta|-d \text{ if } |\beta| < 2^2.$$

And the output value is determined as $$\frac{d}{2}||\beta|-8|-d$$

if $2^2 \leq |\beta|<3 \cdot 2^2$, the output is determined as $$\frac{d}{2}||\beta|-16|-d$$

if $3 \cdot 2^2 \leq |\beta|<5 \cdot 2^2$, the output value is determined as $$\frac{d}{2}||\beta|-24|-d$$

if $5 \cdot 2^2 \leq |\beta|<7 \cdot 2^2$, and the output value is determined as $$\frac{d}{2}||\beta|-32|-d$$

for the other cases.

Next, the calculation expression of $6^{th}$ to $10^{th}$ conditional probability vector is implemented by substituting $\alpha+\beta$ with $\alpha+\beta$ in the first to fifth conditional probability vectors according to the property of the first form.

SECOND EMBODIMENT

The second embodiment of the present invention is a case corresponding to the second form. The second embodiment includes an example of 1024-QAM where the magnitude of QAM is 1024. The order selection of the received signal is intended to apply $\alpha$ first.

As in the first embodiment, the mathematical expression 1 determines the magnitude of the QAM, and the mathematical expression 2 indicates the number of bits set in each point of the combination constellation diagram according to the magnitude of the QAM.

Mathematical Expression 1

$2^{2n}$-QAM, n=2, 3, 4 . . .

Mathematical Expression 2 the number of bits set in each point=2n

Basically, the magnitude of QAM in the second embodiment of the present invention is determined as the above expression, and accordingly the conditional probability vector value of the final output value becomes 2n.

A case where n equals to 5, that is, $2^{2*5}$-QAM equals to 1024-QAM according to the mathematical expression 1 and the number of bits set in each constellation point equals to $2\times5=10$ bits according to the mathematical expression 2 will be explained when n is 5 using such mathematical expressions 1 and 2.

First, the first conditional probability vector calculation is a case of k=1, where the output value is determined as $$\frac{1}{2^5}\alpha$$

unconditionally.

Next, the second (k=2) conditional probability vector calculation expression is a case where the first calculation expression is substituted, where the output value is determined as $$\frac{1}{2^5}\beta.$$

Next, for the third (k=3) conditional probability vector calculation expression, when $\alpha\beta\geqq 0$, the following will be given, where the output value is determined as $$c - \frac{c}{2^4}|\alpha|$$

unconditionally.

However, c is a constant.

When $\alpha\beta<0$, this calculation expression is obtained by substituting $\alpha$ with $\beta$ in the expression used for the method for determining the output of the third conditional probability vector explained just above ($\alpha\beta\geqq 0$).

Next, for the fourth (k=4) conditional probability vector calculation, (1) when $\alpha\beta\geqq 0$, the following will be given, where the output value is determined as $$c - \frac{c}{2^4}|\beta|$$

unconditionally.

(2) When $\alpha\beta<0$, this calculation expression is obtained by substituting $\alpha$ with $\beta$ in the expression used for the method for determining the output of the fourth conditional probability vector explained just above ($\alpha\beta\geqq 0$).

Next, for the fifth (that is, k=5) conditional probability vector calculation expression, when $\alpha\beta\geqq 0$, the following will be given, where a basic expression according to the basic form is determined as $$\frac{d}{2^3}|\alpha| - d.$$

Here, the expression is divided into 2 areas, where if $|\alpha|<2^4$, the output value is determined as $$\frac{d}{2^3}|\alpha| - d,$$

and the output value is determined as $$\frac{d}{2^3}||\alpha| - 32| - d$$

for other cases.

(2) When $\alpha\beta<0$, this calculation expression is obtained by substituting $\alpha$ with $\beta$ in the expression used for the method for determining the output of the fifth conditional probability vector explained just above ($\alpha\beta\geqq 0$).

Next, for the sixth conditional probability vector (that is, k=6), when $\alpha\beta\geqq 0$, a basic expression according to the basic form is determined as $$\frac{d}{2^2}|\alpha| - d,$$

and here, the expression is divided into 3 areas, where if $|\alpha|<2^3$, the output value is determined as $$\frac{d}{2^2}|\alpha| - d,$$

the output value is determined as $$\frac{d}{2^2}||\alpha| - 16| - d,$$

and the output value is determined as $$\frac{d}{2^2}||\alpha| - 32| - d$$

for other cases.

When $\alpha\beta<0$, this calculation expression is obtained by substituting $\alpha$ with $\beta$ in the expression used for the method for determining the output of the sixth conditional probability vector explained just above ($\alpha\beta\geqq 0$).

Next, for the calculation expression of the seventh (k=7) conditional probability vector, when $\alpha\beta\geqq 0$, a basic expression according to the basic form is determined as $$\frac{d}{2}|\alpha| - d,$$

and here, the expression is divided into 5 areas, where if $|\alpha|<2^2$, the output value is determined as $$\frac{d}{2}|\alpha| - d,$$

if $2^2<|\alpha|<3\cdot 2^2$, the output value is determined as $$\frac{d}{2}||\alpha| - 8| - d,$$

if $3\cdot 2^2<|\alpha|<5\cdot 2^2$, the output value is determined as $$\frac{d}{2}||\alpha| - 16| - d,$$

if $5\cdot 2^2<|\alpha|<7\cdot 2^2$, the output value is determined as $$\frac{d}{2}||\alpha| - 24| - d,$$

and the output value is determined as $$\frac{d}{2}||a|-32|-d$$

for the other cases.

When $\alpha\beta<0$, this calculation expression is obtained by substituting $\alpha$ with $\beta$ in the expression used for the method for determining the output of the seventh conditional probability vector explained just above ($\alpha\beta\geqq0$).

A method for obtaining the eighth to tenth conditional probability vectors is obtained by substituting $\alpha$ with $\beta$ and $\beta$ with $\alpha$ in the expression to obtain the fifth to seventh conditional probability vectors.

Next, the second one of the method for demodulating square QAM signal will be explained.

First, a soft decision method of the square QAM corresponding to the first form will be explained. In the case of the first form, while anyone of the real number part and the imaginary number part among the received signal is used in order to calculate the conditional probability vector corresponding to the first half bit combination, the first half is demodulated using a value $\beta$ and the second half is demodulated using a value of $\alpha$ and it output scope is determined between 1 and −1 for convenience's sake in the following description.

Figure 3:
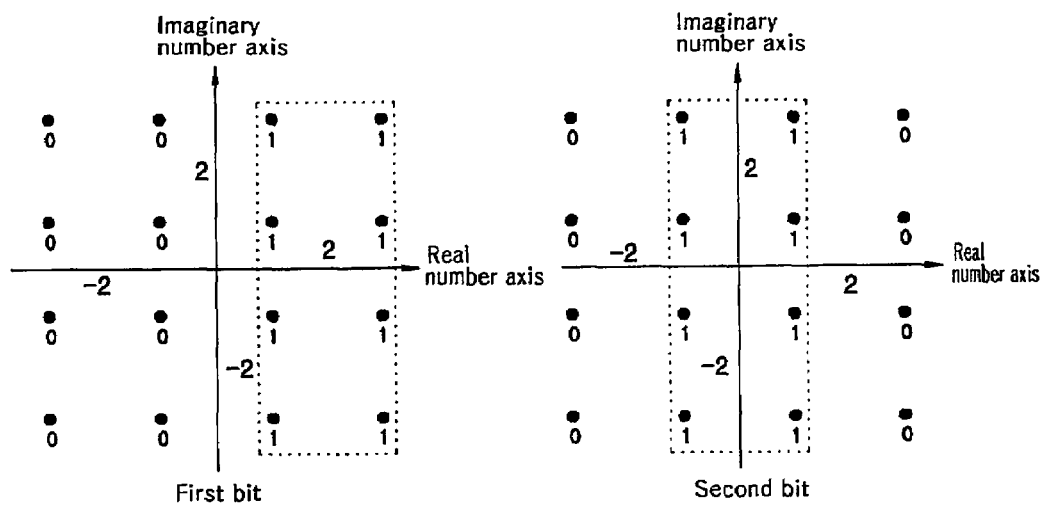
FIGS. 3 and 4 are views for explaining bit patterns in the combination constellation diagram shown in FIG. 2.
Figure 11:
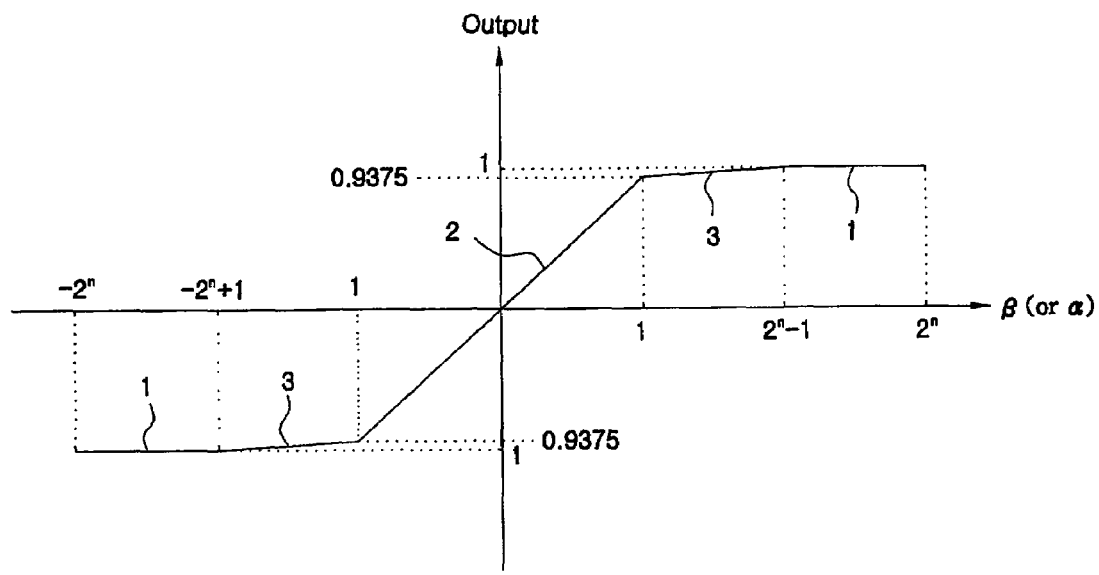
FIG. 11 is a view showing a function applied to a first probability vector of a third embodiment of the present invention.

The method for calculating the conditional probability vector corresponding to the first bit in the first form can be expressed as the mathematical expression 13 and FIGS. 3 and 11 are the visualization of it.

Mathematical Expression 13

If $|\beta|\geqq 2^n-1$, the output is determined as $\text{sign}(\beta)$.

Also, ② if $|\beta|\leqq 1$, the output is determined as $0.9375*\text{sign}(\beta)$.

Also, ③ if $1<|\beta|\leqq 2^n-1$, the output is determined as $$\text{sign}(\beta)\frac{0.0625}{2^n-2}(|\beta|-1)+0.9375*\text{sign}(\beta).$$

However, the $\text{sign}(\beta)$ means a sign of the value sign $\beta$.

Figure 4:
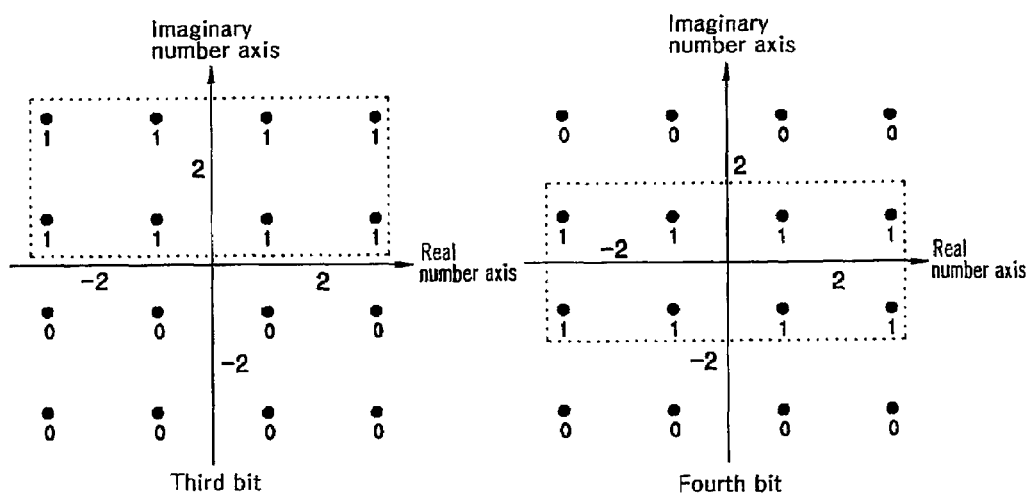
Figure 12:
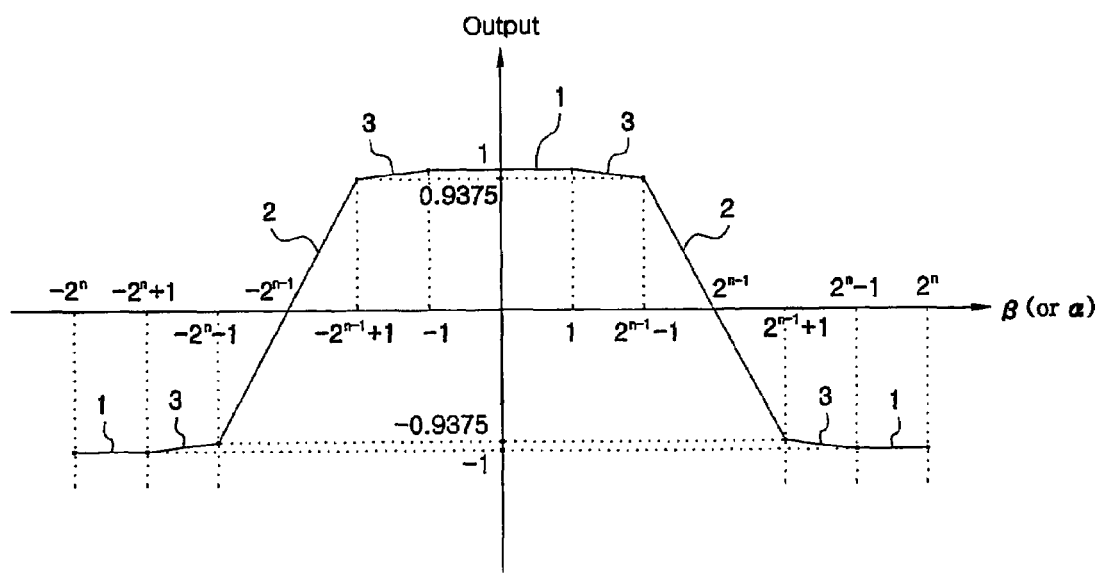
FIG. 12 is a view showing a function applied to a second probability vector of the third embodiment of the present invention.

In the first form, a method for calculating the conditional probability vector corresponding to the second bit can be expressed as the mathematical 14 and FIGS. 4 and 12 are a visualization of it.

Mathematical Expression 14

① If $2^n-2^{n(2-m)}\leqq|\beta|\leqq 2^n-2^{n(2-m)}+1$, the output is determined as $(-1)^{m+1}$.

Also, ② if $2^{n-1}-1\leqq|\beta|\leqq 2^{n-1}+1$, the output is determined as $0.9375(2^{n-1}-|\beta|)$.

Also, ③ if $2^{n-1}-2^{(n-1)(2-m)}+m\leqq|\beta|\leqq 2^n-2^{(n-1)(2-m)}+m-2$, the output is determined as $$-\frac{0.0625}{2^n-2}(|\beta|-2m+1)+0.0375(-1)^{m+1}+0.0625.$$

Here, $m=1$ or $m=2$.

In the first form, a method for calculating the conditional probability vector corresponding to the third to $(n-1)^{th}$ bits can be expressed as the mathematical expression 15.

Mathematical Expression 15

① if $m*2^{n-k+2}-1\leqq|\beta|\leqq m*2^{n-k+2}+1$, the output is determined as $(-1)^{m+1}$.

Also, ② if $(2l-1)*2^{n-k+1}-1<|\beta|\leqq(2l-1)*2^{n-k+1}+1$, the output is determined as $(-1)^{l+1}0.9375\{|\beta|-(2l-1)*2^{n-k+1}\}$.

Also, ③ if $(P-1)*2^{n-k+1}+1<|\beta|\leqq P*2^{n-k+1}-1$, the output depends on the value P, where if the P is odd number, the output is determined as $$\frac{0.0625}{2^{n-K+1}-2}[(-1)^{((p+1)/2)+1}*|\beta|+$$
$$(-1)^{(p+1)/2}[(P-1)*2^{n-k+1}+1]+(-1)^{(p+1)/2}].$$

However, if the value P is even number, the output is determined as $$\frac{0.0625}{2^{n-K+1}-2}[(-1)^{p/2+1}*|\beta|+(-1)^{p/2}(P*2^{n-k+1}-1)]+(-1)^{p/2+1}.$$

Here, $m=0, 1 \ldots 2^{k-2}$, and $l=1, 2, \ldots 2^{k-2}$, also, $P=1, 2, \ldots 2^{k-1}$.

Here, k is bit number, which is an integer more than 3.

In the first form, a method for calculating the conditional probability vector corresponding to the nth bit of the last bit in the first half can be expressed as the mathematical expression 16. That is a specific case of the mathematical expression 16, wherein k=n and the only condition expressions of ① and ② are applied.

Mathematical Expression 16

① If $m*2^2-1\leqq|\beta|\leqq m*2^2+1$, the output is determined as $(-1)^{m+1}$.

Also, ② if $(2l-1)*2^1-1<|\beta|<(2l-1)*2^1+1$, the output is determined as $0.9375\{|\beta|-(2l-1)*2^1\}$.

Here, $m=0, 1, \ldots 2^{n-2}$, and $l=1, 2 \ldots 2^{n-2}$.

A method for calculating the conditional probability vector corresponding to the second half bits of the first form, that is, bit number n+1 to 2n can be performed by substituting $\beta$ with $\alpha$ in the method for obtaining the conditional probability vector of the first half according to the property of the first form. That is, the condition where all of $\beta$ in the mathematical expression 13 is substituted with $\alpha$ becomes the first conditional probability vector of the second half, that is, the conditional probability vector calculation expression corresponding to the $(n+1)^{th}$ bit. Also, the conditional probability vector corresponding to the $(n+2)^{th}$ bit, that is, the second conditional probability vector of the second half can be determined by substituting $\beta$ with $\alpha$ in the mathematical expression 14 that is the condition where the second conditional probability vector of the first half is calculated, and the conditional probability vector corresponding to the bit number n+3 to 2n, that is, the following cases, can be determined by transforming the mathematical expressions 15 and 16 as described above.

Next, a soft decision method of the received signal of a square QAM corresponding to the second form will be explained. Also, for convenience of understanding, the value $\alpha$ is used to determine the conditional probability vector corresponding to the odd-ordered bit and the value $\beta$ is used to determine the even-ordered bit.

Figure 13:
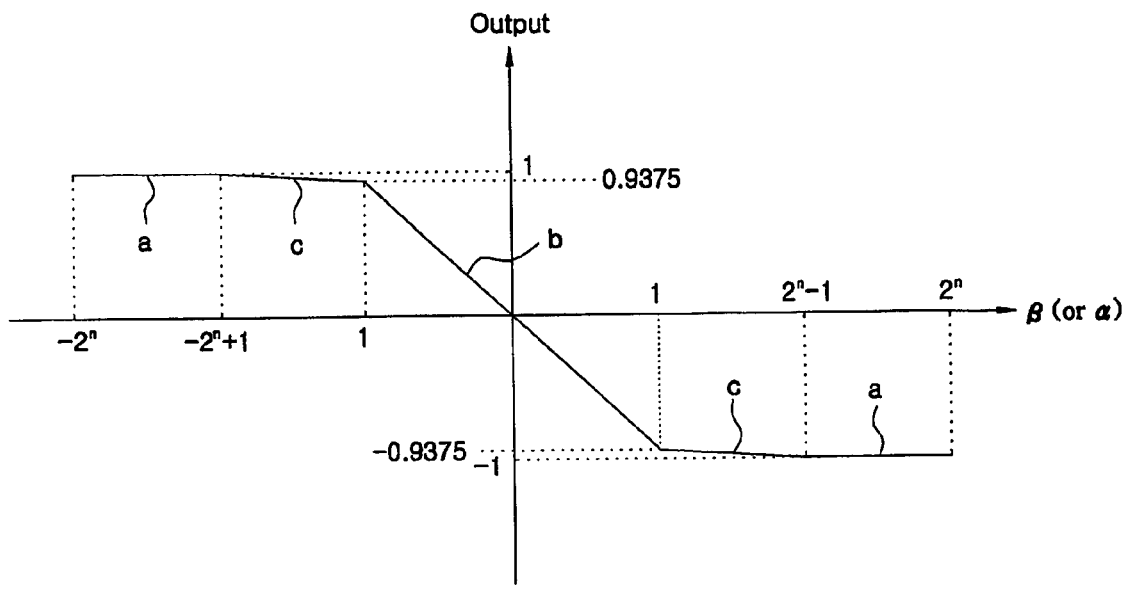
FIG. 13 is a view showing a function applied to a first probability vector of the fourth embodiment of the present invention.

In the second form, the method for calculating the conditional probability vector corresponding the first bit can be expressed as the mathematical expression 17 and FIG. 13 is a visualization of it.

Mathematical Expression 17

(a) if $|\alpha|\geq 2^n-1$, the output is determined as $-\text{sign}(\alpha)$.

Also, (b) if $|\alpha|\leq 1$, the output is determined as $0.9375*\text{sign}(\alpha)$.

Also, (c) if $1<|\alpha|\leq 2^n-1$, the output is determined as $$-\text{sign}(\alpha)\frac{0.0625}{2^n-2}(|\alpha|-1)+0.9375.$$

However, sign($\alpha$) means the sign of the value $\alpha$.

In the second form, a method for calculating the conditional probability vector corresponding to the second bit can be obtained by substituting all of $\alpha$ with $\beta$ in the mathematical expression 17 used to calculate the first conditional probability vector according to the property of the second form.

In the second form, the method for calculating the conditional probability vector corresponding to the third bit can be expressed as the mathematical expression 18.

Mathematical Expression 18

When $\alpha\times\beta\geq 0$, (a) if $2^n-2^{n(2-m)}\leq|\alpha|\leq 2^n-2^{n(2-m)}+1$, the output is determined as $(-1)^m$.

Also, (b) if $2^{n-1}-1\leq|\alpha|\leq 2^{n-1}+1$, the output is determined as $0.9375(|\beta|-2^{n-1})$.

Also, (c) if $2^{n-1}-2^{(n-1)(2-m)}+m\leq|\alpha|\leq 2^n-2^{(n-1)(2-m)}+m-2$, the output is determined as $$\frac{0.0625}{2^n-2}(|\alpha|-2m+1)+0.9735(-1)^m-0.0625.$$

If $\alpha\times\beta<0$, the calculation expression is determined as an expression where all of $\alpha$ are substituted with $\beta$ in the calculation expression of the case of $\alpha\times\beta\geq 0$.

As such, the method for obtaining the conditional probability vector in each cases of $\alpha\times\beta\geq 0$ and $\alpha\times\beta<0$ can be said to be another property. Such property is always applied when obtaining the conditional probability vector corresponding to the third or later bit of the second form, and the mutual substitution property such as substituting $\beta$ with $\alpha$ is also included in this property.

The expression for obtaining the conditional probability vector corresponding to the fourth bit of the second form is obtained by substituting $\alpha$ with $\beta$ and $\beta$ with $\alpha$ in the mathematical expression 18 used to obtain the third conditional probability vector by the property of the second form in the case that the magnitude of the QAM is less than 64-QAM. However, the case where the magnitude of QAM is more than 256-QAM is expressed as the mathematical expression 19.

Mathematical Expression 19

(a) if $m*2^{n-k+3}-1\leq|\alpha|\leq m*2^{n-k+3}+1$, the output is determined as $(-1)^{m+1}$.

Also, (b) if $(2l-1)*2^{n-k+2}-1<|\alpha|<(2l-1)*2^{n-k+2}+1$, the output is determined as $(-1)^{l+1}\{0.9375|\alpha|-0.9375(2l-1)*2^{n-k+2}\}$.

Also, (c) if $(P-1)*2^{n-k+2}+1<|\alpha|\leq P*2^{n-k+2}-1$, the output is determined according to the value P, where if P is an odd number, the output is determined as $$\frac{0.0625}{2^{n-K+2}-2}[(-1)^{(p+1)/2+1}*|\alpha|+(-1)^{(p+1)/2}[(P-1)*2^{n-k+2}+1]]+$$

-continued $$(-1)^{(p+1)/2},$$

if P is an even number, the output is determined as $$\frac{0.0625}{2^{n-K+2}-2}[(-1)^{p/2+1}*|\alpha|+(-1)^{p/2}(P*2^{n-k+2}-1)]+(-1)^{p/2+1}].$$

Here, k is a bit number, and m=0, 1, ... $2^{k-3}$, l=1, 2, ..., $2^{k-3}$, p=1, 2, ... $2^{k-2}$.

An expression for obtaining the conditional probability vector corresponding to the fifth bit of the second form can be expressed as the mathematical expression 20 in the case that the magnitude of QAM is 64-QAM and can be applied the mathematical expression 19 in the case that the magnitude of QAM is more than 256-QAM.

Mathematical Expression 20

When $\alpha\times\beta\geq 0$, (a) if $m*2^2-1<|\beta|\leq m*2^2+1$, the output is determined as $(-1)^{m+1}$.

(b) If $(2l-1)*2^2-1<|\beta|\leq(2l-1)$, the output is determined as $0.9375(-1)^{l+1}\{|\beta|-(2l-1)*2^2\}$.

Here, m=0, 1, 2 and l=1, 2.

If $\alpha\times\beta<0$, the output is obtained by substituting $\beta$ with $\alpha$ in the expressions (a) and (b) according to the property of the second form.

The calculation of the conditional probability vector corresponding to the sixth bit of the second form is obtained by substituting $\alpha$ with $\beta$ and $\beta$ with $\alpha$ in the mathematical expression 20 that is an expression used to obtain the fifth conditional probability vector according to the property of the second form in the case that the magnitude of QAM is 64-QAM. However, a case where the magnitude of QAM is more than 256-QAM is expressed as the mathematical expression 19.

A calculation of the conditional probability vector corresponding to the seventh to n bit of the second form is determined as the mathematical expression 19.

A calculation of the conditional probability vector corresponding to the (n+1)th bit of the second form is expressed as the mathematical expression 21 and this is a specific case of the mathematical expression 19.

Mathematical Expression 21

(a) if $m*2^2-1\leq|\alpha|\leq m*2^2+1$, the output is determined as $(-1)^{m+1}$.

Also, (b) If $(2l-1)*2^1-1<|\alpha|\leq(2l-1)*2^1+1$, the output is determined as $(-1)^{l+1}\{0.9375|\alpha|-0.9375(2l-1)*2^1\}$.

Here, m=0, 1, ... $2^{n-2}$ and l=1, 2 ... $2^{n-2}$.

A calculation of the conditional probability vector corresponding to the $(n+2)^{th}$ bit of the second form is obtained by substituting $\alpha$ with $\beta$ and $\beta$ with $\alpha$ in the mathematical expression 18.

A calculation of the conditional probability vector corresponding to the $(n+3)^{th}$ to $(2n-1)^{th}$ bit of the second form is obtained by substituting $\alpha$ with $\beta$ in the mathematical expression 19. However, the bit number of the value k that is used at this time is 4 to n, which is sequentially substituted instead of n+3 to 2n-1.

A soft decision demodulation of the square QAM can be implemented using the received signal, that is, the value of $\alpha+\beta i$ through such process. However, although the method described above arbitrarily decided the order in selecting the received signal and substituting that into the determination expression for the convenience of understanding, it is noted that it is applied in more general in its real application so that the character α or β expressed in the expression can be freely exchanged according to the combination constellation form of the QAM and the scope of the output value can be asymmetrical such as a value between "a" and "b" as well as a value of "a" or "−a". That enlarges the generality of the present invention and increases its significance. Also, although the mathematical expressions described above seems to be very complicated, they are generalized for general applications so that it is realized that they are very simple viewing them through really applied embodiments.

THIRD EMBODIMENT

The third embodiment of the present invention is a case corresponding to the first form and is applied the property of the first form. The third embodiment includes an example of 1024-QAM where the magnitude of QAM is 1024. The order selection of the received signal is intended to apply α in the first half and β in the second half. (referring to FIGS. 11 and 12).

Basically, QAM in two embodiments of the present invention can be determined as following expression. A mathematical expression 1 determines the magnitude of QAM and a mathematical expression 2 shows the number of bits set in each point of a combination constellation diagram according to the magnitude of QAM.

Mathematical Expression 1

$2^{2n}$-QAM, n=2, 3, 4 ...

Mathematical Expression 2 the number of bits set in each point =2n

Basically, the magnitude of QAM in the third embodiment of the present invention is determined as the following expression, and accordingly the number of the conditional probability vector value of the final output value becomes 2n.

A case where $2^{2*5}$-QAM equals to 1024-QAM according to the mathematical expression 1 and the number of bits set in each constellation point equals to 2×5=10 bits according to the mathematical expression 2 will be explained when n is 5 using such mathematical expressions 1 and 2. First, prior to entering into calculation expression applications, it is noted that if a calculation expression for 5 bits of the first half among 10 bits are known by the property of the first form, a calculation expression for remaining 5 bits of the second half is also known directly.

First, for the first conditional probability vector calculation expression, if $|\beta|>2^5-1$, the output is determined as sign(β).

However, ② if $|\beta|\leq 1$, the output is determined as 0.9375*sign(β).

Also, ③ if $2<|\beta|\leq 2^5-1$, the output is determined as $$\text{sign}(\beta)\left[\frac{0.0625}{2^5-2}(|\beta|-1)+0.9375\right].$$

Next, for the second (that is, k=2, m=1, 2) conditional probability vector, if $0\leq|\beta|\leq 1$, the output is determined as 1.

Also, if $2^5-1\leq|\beta|\leq 2^5$, the output is determined as −1.

Also, if $2^4-1\leq|\beta|\leq 2^4+1$, the output is determined as 0.9375($2^4-|\beta|$).

Also, if $1\leq|\beta|\leq 2^4-1$, the output is determined as $$-\frac{0.0625}{2^4-2}(|\beta|-1)+1,$$

and if $2^4+1\leq|\beta|\leq 2^5-1$, the output is determined as $$-\frac{0.0625}{2^4-2}(|\beta|-3)-0.825.$$

Next, for the third (that is, k=3, m=0, 1, 2, l=1, 2, p=1, 2, 3, 4) conditional probability vector calculation expression, ① If $m*2^4-1\leq|\beta|\leq m*2^4+1$, the output is determined as $(-1)^{m+1}$.

At this time, when substituting m=0, 1, 2, if $-1<|\beta|\leq 1$, the output is determined as 1.

Also, if $2^4-1<|\beta|\leq 2^4+1$, the output is determined as 1.

Also, if $2^5-1<|\beta|\leq 2^5+1$, the input is determined as −1.

Also, ② if $(2l-1)*2^3-1<|\beta|\leq(2l-1)*2^3+1$, the output is determined by substituting l=1, 2 into $(-1)^{l+1}0.9375\{|\beta|-(2l-1)*2^3\}$. Here, if $2^3-1<|\beta|\leq 2^3+1$, the output is determined as $0.9375(|\beta|-2^3)$, and if $3*2^3-1<|\beta|\leq 3*2^3+1$, the output is determined as $-0.9375(|\beta|-3*2^3)$.

Also, ③ when $(P-1)*2^3+1<|\beta|\leq P*2^3-1$ and substituting P=1, 2, 3 and 4 according to whether P is odd number or even number, if $1<|\beta|\leq 2^3-1$, the output is determined as $$\frac{0.0625}{2^3-2}(|\beta|-1)-1,$$

also, if $2^3+1<|\beta|\leq 2^4-1$, the output is determined as $$\frac{0.0625}{2^3-2}(|\beta|-2^4+1)+1,$$

also, if $2^4+1<|\beta|\leq 3*2^3-1$, the output is determined as $$\frac{0.0625}{2^3-2}(2^4+1-|\beta|)+1,$$

also, $3*2^3+1<|\beta|\leq 2^5-1$, the output is determined as $$\frac{0.0625}{2^3-2}(2^5+1-|\beta|)-1.$$

Next, for the fourth (that is, k=4, m=0, 1, 2, 3 and 4, l=1, 2, 3 and 4, p=1, 2, 3, 4, 5, 6, 7 and 8) conditional probability vector calculation expression, if $-1<|\oplus|\leq 1$, the output is determined as −1.

Also, if $2^3-1<|\oplus|\leq 2^3+1$, the output is determined as 1.

Also, if $2^4-1<|\beta|\leq 2^4+1$, the output is determined as −1.

Also, if $3*2^3-1<|\beta|\leq 3*2^3+1$, the output is determined as 1.

Also, if $2^5-1<|\beta|\leq 2^5+1$, the output is determined as −1.

Also, if $2^2-1<|\beta|\leq 2^2+1$, the output is determined as $0.9375\{|\beta|-2^2\}$.

Also, if $3*2^2-1<|\beta|\leq 3*2^2+1$, the output is determined as $-0.9375\{|\beta|-3*2^2\}$.

Also, if $5*2^2-1<|\beta|\leq 5*2^2+1$, the output is determined as $0.9375\{|\beta|-5*2^2\}$. Also, if $7*2^2-1<|\beta|\leq 7*2^2+1$, the output is determined as $-0.9375\{|\beta|-7*2^2\}$. Also, if $1<|\beta|\leq 2^2-1$, the output is determined as $$\frac{0.0625}{2^2-2}(|\beta|-1)-1.$$

Also, if $2^2+1<|\beta|\leq 2^3-1$, the output is determined as $$\frac{0.0625}{2^2-2}(|\beta|-2^3+1)+1.$$

Also, if $2^3+1<|\beta|\leq 3*2^2-1$, the output is determined as $$\frac{0.0625}{2^2-2}(2^3+1-|\beta|)+1.$$

Also, if $6*2^2+1<|\beta|\leq 7*2^2-1$, the output is determined as $$\frac{0.0625}{2^2-2}(6*2^2+1-|\beta|)+1.$$

Also, if $7*2^2+1<|\beta|\leq 2^5-1$, the output is determined as $$\frac{0.0625}{2^2-2}(2^5-1-|\beta|)-1.$$

Next, for the fifth (that is, k=5, m=0, 1, 2, ... 7, 8, l=1, 2, 3, ... 7, 8) conditional probability vector calculation expression, if $-1<|\beta|\leq 1$, the output is determined as $-1$.
Also, if $2^2-1<|\beta|\leq 2^2+1$, the output is determined as 1.
Also, if $3*2^2-1<|\beta|\leq 3*2^2+1$, the output is determined as $-1$.
Also, if $7*2^2-1<|\beta|\leq 7*2^2+1$, the output is determined as 1.
Also, if $2^5-1<|\beta|\leq 2^5+1$, the output is determined as $-1$.
Also, if $1<|\beta|\leq 3$, the output is determined as $0.9375(|\beta|-2)$.
Also, if $5<|\beta|\leq 7$, the output is determined as $-0.9375(|\beta|-6)$.
Also, if $9<|\beta|\leq 11$, the output is determined as $0.9375(|\beta|-10)$.
Also, if $25<|\beta|\leq 27$, the output is determined as $0.9375(|\beta|-26)$.
Also, if $29<|\beta|\leq 31$, the output is determined as $-0.9375(|\beta|-30)$.
Next, the calculation expressions of the sixth to tenth conditional probability vectors can be obtained by substituting $\beta$ with $\alpha$ in the first to fifth conditional probability vector according to the property of the first form.

FOURTH EMBODIMENT

The fourth embodiment of the present invention is a case corresponding to the second form and is applied the property of the second form. The fourth embodiment includes an example of 1024-QAM where the magnitude of QAM is 1024. The order selection of the received signal is intended to apply $\alpha$ at first.

A mathematical expression 1 determines the magnitude of QAM and a mathematical expression 2 shows the number of bits set in each point of a combination constellation diagram according to the magnitude of QAM, as is in the third embodiment.

Mathematical Expression 1

$2^{2n}$-QAM, n=2, 3, 4 ...

Mathematical Expression 2 the number of bits set in each point=2n

Basically, the magnitude of QAM in the fourth embodiment of the present invention is determined as the above expression, and accordingly the number of the conditional probability vector value of the final output value becomes 2n.

A case where $2^{2*5}$-QAM equals to 1024-QAM according to the mathematical expression 1 and the number of bits set in each constellation point equals to 2×5=10 bits according to the mathematical expression 2 will be explained when n is 5 using such mathematical expressions 1 and 2. (referring to FIGS. 13 and 14).

First, the calculation of the first conditional probability vector,
if $|\alpha|>2^5-1$, the output is determined as $-\text{sign}(\alpha)$.
Also, if $|\alpha|\leq 1$, the output is determined as $-0.9375\,\text{sign}(\alpha)$.
Also, if $1<|\alpha|\leq 2^5-1$, the output is determined as $$-\text{sign}(\alpha)\left[\frac{0.0625}{2^5-2}(|\alpha|-1)+0.9375\right].$$

Next, the second conditional probability vector calculation expression is a substitution form of the first calculation expression as follows.
(a) If $|\beta|>2^5-1$, the output is determined as $-\text{sign}(\beta)$.
(b) if $|\beta|\leq 1$, the output is determined as $-0.9375\,\text{sign}(\beta)$.
(c) $1<|\beta|\leq 2^5-1$, the output is determined as $-\text{sign}(\beta)\{0.0021(|\beta|-1)+0.9375\}$.

Next, for the third conditional probability vector calculation expression, when $\alpha\beta\geq 0$,
(a) if $2^5-2^{5(2-m)}\leq |\alpha|<2^5-2^{5(2-m)}+1$, the output is determined as $(-1)^m$.

At this time, since m equals to 1 and 2, when substituting that, if $0\leq |\alpha|<1$, the output is determined as $-1$.
Also, if $2^5-1\leq |\alpha|<2^5$, the output is determined as 1.
Also, (b) if $2^4-1\leq |\alpha|<2^4+1$, the output is determined as $0.9375(|\alpha|-2^4)$.
Also, (c) if $2^4-2^{4(2-m)}+m\leq |\alpha|<2^5-2^{4(2-m)}+m-2$, the output is determined as $$\frac{0.0625}{2^4-2}(|\alpha|-2m+1)+0.9735(-1)^m-0.0625.$$

Here, when substituting m=1, 2,
if $1\leq |\alpha|<2^4-1$, the output is determined as $$\frac{0.0625}{2^4-2}(|\alpha|-1)-1.$$

Also, if $2^4+1 \leq |\alpha| < 2^5-1$, the output is determined as $$\frac{0.0625}{2^4-2}(|\alpha|-3)+0.825.$$

When $\alpha\beta<0$,
in this case, the calculation expression is obtained by substituting $\alpha$ with $\beta$ in the expressions ⓐ, ⓑ, ⓒ of the method for determining the output of the third conditional probability vector described just above.

Next, for the fourth (that is, k=4, m=0, 1, 2, l=1, 2, p=1, 2, 3, 4) conditional probability vector calculation, When $\alpha\beta\geq 0$,
ⓐ if $m*2^4-1 \leq |\alpha| < m*2^4+1$, the output is determined as $(-1)^{m+1}$.

At this time, substituting m=0, 1, 2, if $-1<|\alpha|\leq 1$, the output is determined as $-1$.

Also, if $2^4-1 \leq |\alpha| < 2^4+1$, the output is determined as 1.
Also, if $2^5-1 \leq |\alpha| < 2^5+1$, the output is determined as $-1$.

Also, ⓑ if $(2l-1)*2^3-1 \leq |\alpha| < (2l-1)*2^3+1$, the output is determined by substituting l=1, 2 in the $(-1)^{l+1}\{0.9375|\alpha|-0.9375(2l-1)*2^3\}$, here, if $2^3-1 \leq |\alpha| < 2^3+1$, the output is determined as $0.9375(|\alpha|-2^3)$.

Also, if $3*2^3-1 \leq |\alpha| \leq 3*2^3+1$, the output is determined as $-0.9375(|\alpha|-3*2^3)$.

Also, ⓒ if $(P-1)*2^3+1 \leq |\alpha| \leq P*2^3-1$ and P is an odd number, the output is determined as $$\frac{0.0625}{2^3-2}[(-1)^{(p+1)/2+1}*|\alpha|+(-1)^{(p+1)/2}(P-1)*2^3+1]+(-1)^{(p+1)/2}.$$

However, if P is an even number, the output is determined as $$\frac{0.0625}{2^3-2}[(-1)^{p/2+1}*|\alpha|+(-1)^{p/2}(P*2^3-1)]+(-1)^{p/2+1}.$$

Here, when substituting p=1, 2, 3, 4,
if $1<|\alpha|\leq 2^3-1$, the output is determined as $$\frac{0.0625}{2^3-2}[|\alpha|-1]-1.$$

Also, if $2^3+1<|\alpha|\leq 2^4-1$, the output is determined as $$\frac{0.0625}{2^3-2}[|\alpha|-2^4+1]+1.$$

Also, if $2^4+1<|\alpha|\leq 3*2^3-1$, the output is determined as $$\frac{0.0625}{2^3-2}[2^4+1-|\alpha|]+1.$$

Also, if $3*2^3+1<|\alpha|\leq 2^5-1$, the output is determined as $$\frac{0.0625}{2^3-2}[2^5+1-|\alpha|]-1.$$

When $\alpha\beta<0$,
in this case, the calculation expression is obtained by substituting $\alpha$ with $\beta$ in the expressions of ⓐ, ⓑ, ⓒ of the method for determining the output of the fourth conditional probability vector described just above.

Next, for the fifth (that is, k=5, m=0, 1, 2, 3, 4, l=1, 2, 3, 4) conditional probability vector, (1) when $\alpha\beta\leq 0$,
ⓐ if $m*2^3-1<|\alpha|\leq m*2^3+1$, the output is determined as $(-1)^{m+1}$.

At this time, when substituting m=0, 1, 2, 3, 4,
if $-1<|\alpha|\leq 1$, the output is determined as $-1$.

Also, if $2^3-1<|\alpha|\leq 2^3+1$, the output is determined as 1.
Also, if $2^4-1<|\alpha|\leq 2^4+1$, the output is determined as $-1$.
Also, if $3*2^3-1<|\alpha|\leq 3*2^3+1$, the output is determined as 1.

Also, if $2^5-1<|\alpha|\leq 2^5+1$, the output is determined as $-1$.

Also, ⓑ if $(2l-1)*2^2-1<|\alpha|\leq (2l-1)*2^2+1$, the output is determined by substituting l=1, 2, 3, 4 in the $(-1)^{l+1}0.9375\{|\alpha|-0.9375(2l-1)*2^3\}$, here, if $2^2-<|\alpha|\leq 2^2+1$, the output is determined as $0.9375(|\alpha|=2^2)$.

Also, if $3*2^2-1<|\alpha|\leq 3*2^2+1$, the output is determined as $-09375(|\alpha|-3*2^2)$.

Also, if $5*2^2-1<|\alpha|\leq 5*2^2+1$, the output is determined as $0.9375(|\alpha|-5*2^2)$.

Also, if $7*2^2-1<|\alpha|\leq 7*2^2+1$, the output is determined as $-0.9375(|\alpha|-7*2^2)$.

Also, ⓒ when $(P-1)*2^2+1<|\alpha|\leq P*2^2-1$, and substituting p=1, 2, 3, ... 7, 8 according to whether P is an odd number or an even number, if $1<|\alpha|\leq 2^2-1$, the output is determined as $$\frac{0.0625}{2^2-2}[|\alpha|-1]-1.$$

Also, if $2^2+1<|\alpha|\leq 2^3-1$, the output is determined as $$\frac{0.0625}{2^2-2}[|\alpha|-2^3+1]+1.$$

Also, if $2^3+1<|\alpha|\leq 3*2^2-1$, the output is determined as $$\frac{0.0625}{2^2-2}[2^3+1-|\alpha|]+1.$$

Also, if $3*2^2+1<|\alpha|\leq 2^4-1$, the output is determined as $$\frac{0.0625}{2^2-2}[2^4-1-|\alpha|]-1.$$

Also, if $2^4+1<|\alpha|\leq 5*2^2-1$, the output is determined as $$\frac{0.0625}{2^2-2}[|\alpha|-2^4-1]-1.$$

Also, if $5*2^2+1<|\alpha|\leq 6*2^2-1$, the output is determined as $$\frac{0.0625}{2^2-2}[|\alpha|-6*2^2+1]+1.$$

Also, if $6*2^2+1<|\alpha|\leq 7*2^2-1$, the output is determined as $$\frac{0.0625}{2^2-2}[6*2^2+1-|\alpha|]+1.$$

Also, if $7*2^2+1<|\alpha|\leq 2^5-1$, the output is determined as $$\frac{0.0625}{2^2-2}[2^5-1-|\alpha|]-1.$$

When $\alpha\beta<0$, in this case, the calculation expression is obtained by substituting $\alpha$ with $\beta$ in the (a), (b), (c) expressions of the method for determining the fifth conditional probability vector ($\alpha\beta<0$) described just above.

Next, for the sixth conditional probability vector (that is, k=6, m=0, 1, 2, ... 7, 8, l=1, 2, 3, ... 7, 8), (1) when $\alpha\beta\geq 0$, (a) if $m*2^2-1<|\alpha|\leq m*2^2+1$, the output is determined as $(-1)^{m+1}$.

At this time, the output is obtained by applying m=0, 1, 2, ... 7, 8.

That is, if $-1<|\alpha|\leq 1$, the output is determined as $-1$.

Also, if $2^2-1<|\alpha|\leq 2^2+1$, the output is determined as 1.

Also, if $3*2^2-1<|\alpha|\leq 3*2^2+1$, the output is determined as $-1$.

Also, if $7*2^2-1<|\alpha|\leq 7*2^2+1$, the output is determined as 1.

Also, if $2^5-1<|\alpha|\leq 2^5+1$, the output is determined as $-1$.

Also, (b) if $(2l-1)*2-1<|\alpha|\leq (2l-1)*2+1$, the output is determined by substituting l=1, 2, 3, ... 7, 8 in the $(-1)^{l+1}\{0.9375|\alpha|-0.9375(2l-1)*2\}$, here, if $1<|\alpha|\leq 3$, the output is determined as $0.9375(|\alpha|-2)$.

Also, if $5<|\alpha|\leq 7$, the output is determined as $-0.9375(|\alpha|-6)$.

Also, if $9<|\alpha|\leq 11$, the output is determined as $0.9375(|\alpha|-10)$.

Also, if $25<|\alpha|\leq 27$, the output is determined as $0.9375(|\alpha|-26)$.

Also, if $29<|\alpha|\leq 31$, the output is determined as $-0.9375(|\alpha|-30)$.

(2) When $\alpha\beta<0$, in this case, the calculation expression is obtained by substituting $\alpha$ with $\beta$ in the (a), (b) expressions of the method for determining the output of the fifth conditional probability vector ($\alpha\beta\geq 0$) described just above.

Next, the calculation expressions of the seventh to tenth conditional probability vector are obtained by substituting $\alpha$ with $\beta$ and $\beta$ with $\alpha$ in the calculation expressions of the third to sixth conditional probability vector.

Figure 14:
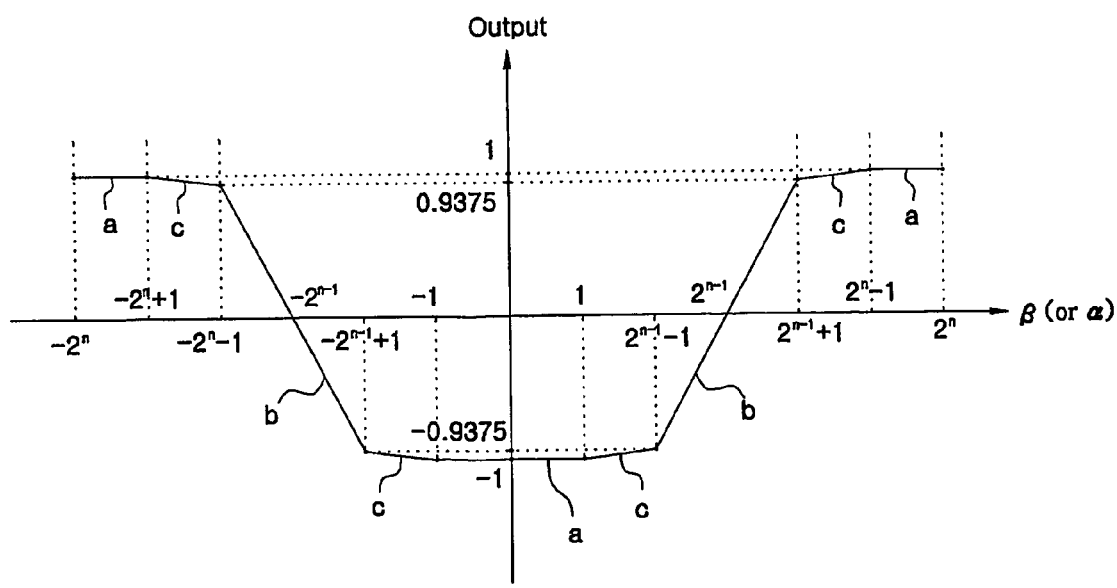
FIG. 14 is a view showing a function applied to a second probability vector of the fourth embodiment of the present invention.

FIG. 14 is a view showing a functional block for a conditional probability vector decision process in accordance with the present invention.

Figure 15:
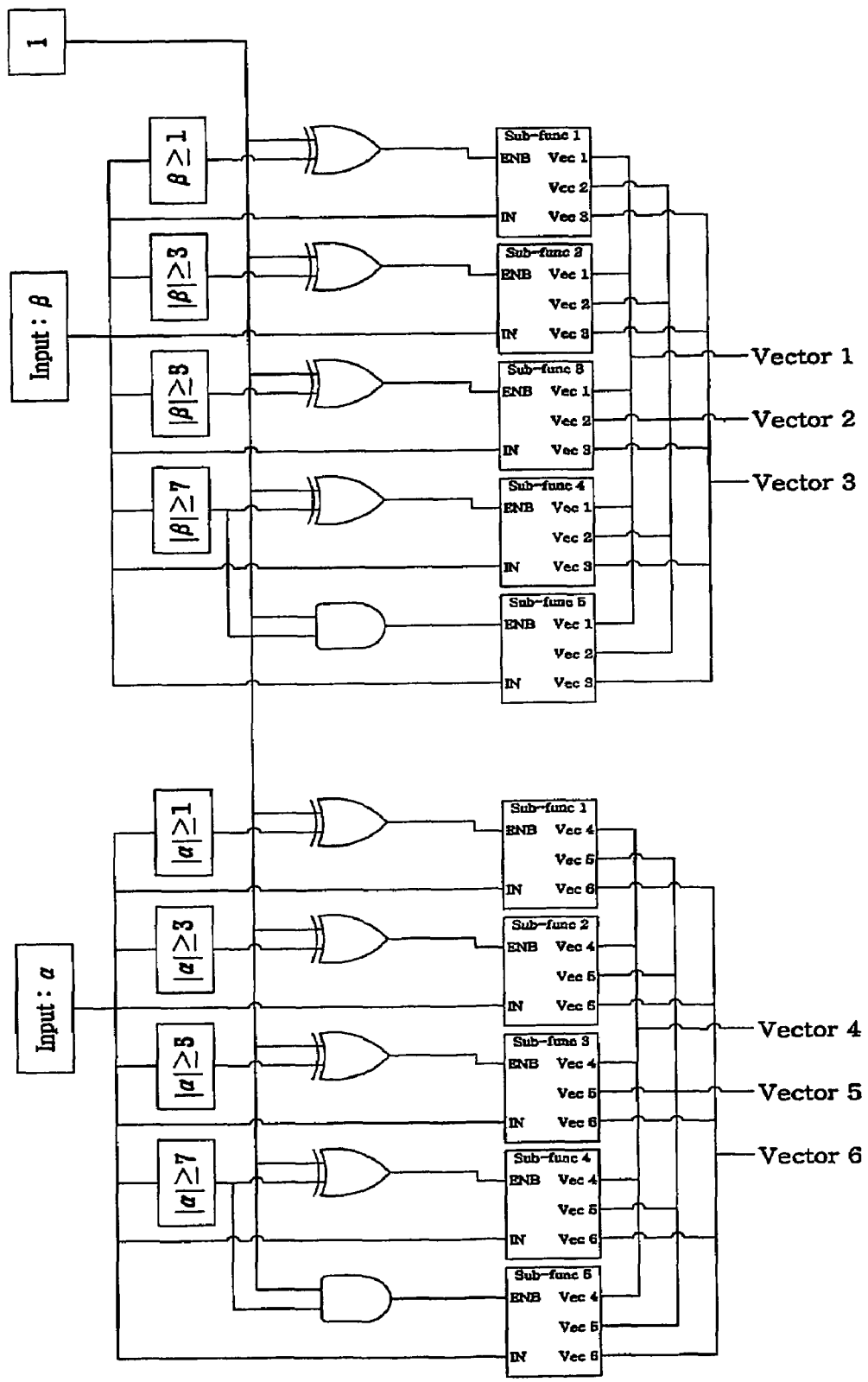
FIG. 15 is a view showing a hardware configuration for the soft decision of a first form of 64-QAM in accordance with the present invention.

FIG. 15 is a view showing an example of hard ware configuration for a conditional probability vector of a first form of 64-QAM in accordance with the present invention. A person skilled in the art can configure the hard ware by making a modification within the scope of the present invention.

While the present invention has been described in conjunction with preferred embodiments thereof, it is not limited by the foregoing description, but embraces alterations, modifications and variations in accordance with the spirit and scope of the appended claims.

INDUSTRIAL APPLICABILITY

In accordance with the present invention, it is expected to enhance the process speed remarkably and to save a manufacturing cost upon embodying hard ware by applying a linear conditional probability vector equation instead of a log likelihood ratio method being soft decision demodulation method of a square QAM signal that is generally used in the industrial field.

The invention claimed is:

1. A soft decision method for demodulating a received signal $\alpha+\beta i$ of a square Quadrature Amplitude Modulation (QAM) consisting of an in-phase signal component and a quadrature phase signal component, comprising:

receiving the signal $\alpha+\beta i$ in a radio communication apparatus;

obtaining a plurality of conditional probability vector values, each being a soft decision value corresponding to a bit position of a hard decision, using a function including a conditional determination operation from the quadrature phase component and the in-phase component of the received signal, wherein a conditional probability vector decision method for demodulating a first half of a total number of bits is the same as a decision method for demodulating the remaining half of the bits, and is determined by substituting a quadrature phase component value and an in-phase component value with each other, and wherein the demodulation method of the conditional probability vector corresponding to an odd-ordered bit is the same as a calculation method of the conditional probability vector corresponding to the next even-ordered bit, where the received signal value used to calculate the conditional probability vector corresponding to the odd-ordered bit uses one of the $\alpha$ and $\beta$ according to a given combination constellation diagram and the received signal value for the even-ordered bit uses the remaining one of $\alpha$ and $\beta$.

2. The method according to claim 1, wherein a first conditional probability vector is determined by selecting any one of the received signal components $\alpha$ and $\beta$ according to a form of a combination constellation diagram and then according to the following mathematical expression:

an output value is unconditionally determined as $$-\frac{a}{2^n}\Omega,$$

where $\Omega$ is a selected and received value that is one of $\alpha$ and $\beta$, n is a magnitude of the QAM, that is, a parameter used to determine $2^{2n}$, and a is an arbitrary real number set according to a desired output scope.

3. The method according to claim 2, wherein a second conditional probability vector is determined by substituting the received value selected with the received value that is not selected in the method for obtaining the first conditional probability vector.

4. The method according to claim 1, wherein a third conditional probability vector is determined by selecting one of the received values $\alpha$ and $\beta$ according to a form of a combination constellation diagram, using the following mathematical expression (B) in the case of $\alpha\beta\geqq 0$, and substituting a received value selected in th e mathematical expression (B) with a received value that is not selected in the expression in the case of $\alpha\beta<0$, where in the mathematical expression (B) an output value is determined as $$a\left(c - \frac{c}{2^{n-1}}|\Omega|\right),$$

where $\Omega$ is a selected and received value, n is a magnitude of the QAM, that is, a parameter used to determine $2^{2n}$, a is an arbitrary real number set according to a desired output scope, and c is an arbitrary constant.

5. The method according to claim 4, wherein a fourth conditional probability vector is calculated by substituting each of the received values used with each of the received values that are not used in the method for obtaining the third conditional probability vector in the cases of $\alpha\beta\geqq 0$ and $\alpha\beta<0$.

6. The method according to claim 1, wherein a fifth conditional probability vector is determined by selecting one of the received values $\alpha$ and $\beta$ according to the form of the combination constellation diagram, using the following mathematical expression (C) in the case of $\alpha\beta\geqq 0$, and determines by substituting the received value selected in the mathematical expression (C) with the received value that is not selected in the expression in the case of $\alpha\beta<0$, where in the mathematical expression (C), ① first, dividing an output diagram in a shape of a basic V form, and the conditional probability vector corresponding to each bit is divided into 2 areas, ② a basic expression according to a basic form is determined as $$a\left(\frac{d}{2^{n-2}}|\Omega| - d\right),$$

③ an output is determined by finding an involved area using a given $\Omega$ and substituting a value of $(|\Omega|-m)$ that a middle value is subtracted from each area into the basic expression as a new $\Omega$, ④ rendering the middle value as $m=2^n$ and substituting the value of $|\Omega|-m$ into the basic expression as a new $\Omega$ in an area that is in the most outer left and right sides among the divided areas, that is, $7\cdot 2^{n-3}<|\Omega|$, where $\Omega$ is a selected and received value, n is a magnitude of the QAM, that is, a parameter used to determine $2^{2n}$, d is a constant, and a is a constant determining the output scope.

7. The method according to claim 6, wherein when the magnitude of QAM is 64-QAM, a sixth conditional probability vector is calculated by substituting each of received values used with each of the received values that are not used in the method for obtaining the fifth conditional probability vector in the cases of $\alpha\beta\geqq 0$ and $\alpha\beta<0$.

8. The method according to claim 1, wherein when the magnitude of QAM is more than 256-QAM, fifth to $(n=2)^{th}$ conditional probability vectors are determined by selecting one of the received values $\alpha$ and $\beta$ according to the form of the combination constellation diagram, using the following mathematical expression (D) in the case of $\alpha\beta\geqq 0$, and substituting the received value selected in the mathematical expression (D) with the received value that is not selected in the case of $\alpha\beta<0$, where in the mathematical expression (D), ① first, dividing an output diagram in a shape of a basic V form, and the conditional probability vector corresponding to each bit is divided into $(2^{k-5}+1)$ areas, ② a basic expression according to the basic form is determined as $$a\left(\frac{d}{2^{n-k+3}}|\Omega| - d\right),$$

③ an output is determined by finding an involved area using a given $\Omega$ and substituting a value of $|\Omega|-m$ that a middle value m (for example, in the case of k=6, since repeated area is 1, this area is $2^{-2}\geqq|\Omega|<3\cdot 2^{n-2}$ and the middle value is $m=2^{n-1}$) is subtracted from each area into the basic expression as a new $\Omega$, ④ rendering the middle value as $m=2^n$ and substituting the value of $|\Omega|-m$ into the basic expression as a new $\Omega$ in an area that is in the most outer left and right sides among the divided areas, that is, $(2^{k-2}-1)2^{n-k+2}<|\Omega|$, where k is the conditional probability vector number (5, 6, ... n), $\Omega$ is a selected and received value, n is a magnitude of the QAM, that is, a parameter used to determine $2^{2n}$, a is a constant determining the output scope, and d is a constant that changes according to a value of k.

9. The method according to claim 8, wherein when the magnitude of QAM is more than 256-QAM, the $(n+3)^{th}$ to $(2n)^{th}$ conditional probability vectors are selected by the mathematical expression (D) using the received value that is not selected when determining the fifth to $(n+2)^{th}$ conditional probability vector in the case of $\alpha\beta\geqq 0$, and is obtained by substituting the received value selected in the mathematical expression (D) with the received value that is not selected in the expression in the case of $\alpha\beta<0$.

10. The method according to claim 1, wherein a first conditional probability vector is determined by selecting any one of the received values $\alpha$ and $\beta$ according to a form of the combination constellation diagram and then according to the following mathematical expression (E), where in the mathematical expression (E), ① if $|\Omega|\geqq 2^n-1$, an output is determined as $a*\text{sign}(\Omega)$, also, ② if $|\Omega|\leqq 1$, the output is determined as $a*0.9375*\text{sign}(\Omega)$, also, ③ if $1<|\Omega|\leqq 2^n-1$, the output is determined as $$a*\text{sign}(\Omega)\left[\frac{0.0625}{2^n - 2}(|\Omega| - 1) + 0.9375\right],$$

where $\Omega$ is any one of the received values $\alpha$ and $\beta$, 'sign $(\Omega)$' indicates the sign of the selected and received value, 'a' is an arbitrary real number set according to a desired output scope, α is a received value of I (real number) channel, and β is a received value of Q (imaginary number) channel.

11. The method according to claim 1, wherein a second conditional probability vector is determined by a received value selected when determining a first conditional probability vector and the following mathematical expression (F), wherein the mathematical expression (F)

① if $2^n-2^{n(2-m)} \leq |\Omega| \leq 2^n-2^{n(2-m)}+1$, an output is determined as $a*(-1)^{m+1}$, ② if $2^{n-1}-1 \leq |\Omega| \leq 2^{n-1}+1$, the output is determined as $a*0.9375(2^{n-1}-|\Omega|)$, ③ if $2^{n-1}-2^{(n-1)(2-m)}+m \leq |\Omega| \leq 2^n-2^{(n-1)(2-m)}+m-2$, the output is determined as $$-a*\left[\frac{0.0625}{2^n-2}(|\Omega|-2m+1)+0.9735(-1)^{m+1}+0.0625\right],$$

where Ω is a selected and received value, n is the magnitude of QAM, that is, a parameter used to determine $2^{2n}$, 'a' is an arbitrary real number set according to a desired output scope, and m=1, 2.

12. The method according to claim 11, wherein third to $(n-1)^{th}$ conditional probability vectors of the first form are determined by the received value selected when determining the first conditional probability vector and the mathematical expression (G), where in the mathematical expression (G), ① if $m*2^{n-k+2}-1<|\Omega| \leq m*2^{n-k+2}+1$, the out is determined as $a*(-1)^{m+1}$, also, ② if $(2l-1)*2^{n-k+1}-1<|\Omega| \leq (2l-1)*2^{n-k+1}+1$, the output is determined as $a*(-1)^{l+1}0.9375\{(|\Omega|-(2l-1)*2^{n-k+1})\}$, also, ③ if $(P-1)*2^{n-k+1}+1<|\Omega| \leq P*2^{(n-k+1)}-1$, when P is an odd number, the output is determined as $$a*\left[\frac{0.0625}{2^{n-k+1}-2}[(-1)^{(p+1)/2+1}*|\Omega|+(-1)^{(p+1)/2}[(P-1)*2^{n-k+1}+1]+(-1)^{(p+1)/2}]\right],$$

when P is an even number, the output is determined as $$a*\left[\frac{0.0625}{2^{n-K+1}-2}[(-1)^{p/2+1}*|\Omega|+(-1)^{p/2}(P*2^{n-k+1}-1)]+(-1)^{p/2+1}\right],$$

where m in mathematical expression (G) is 0, 1, ... $2^{k-2}$, and l is 1, 2, ... $3^{k-2}$, k is conditional probability vector number (k=3, ... n-1).

13. The method according to claim 12, wherein the $n^{th}$ conditional probability vector is determined by the received value selected when determining the first conditional probability vector and the following mathematical expression (H), where in the mathematical expression (H), ① if $m*2^2-1 \leq |\Omega| \leq m*2^{n2}+1$, the output is determined as $a*(-1)^{m+1}$, also, ② if $(2l-1)*2^1-1<|\Omega| \leq (2l-1)*2^1+1$, the output is determined as $a*(-1)^{l+1}0.9375\{(|\Omega|-(2l-1)*2^1)\}$, where m in mathematical expression (H) is 0, 1, ... $2^{n-2}$ and l is 1, 2, ... $3^{n-2}$.

14. The method according to claim 13, wherein the $(n+1)^{th}$ to $2n^{th}$ conditional probability vectors are sequentially obtained using the received value that is not selected when determining the first conditional probability vector and the mathematical expressions (F) to (H), respectively, except that the conditional probability vector number k included in the mathematical expression (G) is sequentially used as 3 to n-1 instead of n+3 to 2n-1.

15. The method according to claim 1, wherein a first conditional probability vector is determined by selecting any one of the received values α and β according to a form of the combination constellation diagram and then according to the mathematical expression (I), where in the mathematical expression (I), ① if $|\Omega| \geq 2^n-1$, the output is determined as $-a*\text{sign}(\Omega)$, also, ② if $|\Omega| \leq 1$, the output is determined as $a*0.9375*\text{sign}(\Omega)$, also, ③ if $1<|\Omega| \leq 2^n-1$, the output is determined as $$-a*\left[\text{sign}(\Omega)\frac{0.0625}{2^n-2}(|\Omega|-1)+0/9275\right],$$

where 'sign(Ω)' indicates the sign of the selected and received value.

16. The method according to claim 1, wherein a second conditional probability vector is calculated by substituting a received value selected in a method for obtaining a first conditional probability vector with a received value that is not selected in the method.

17. The method according to claim 1, wherein a third conditional probability vector is determined by selecting any one of the received values α and β according to a combination constellation diagram, using the following mathematical expression (J) in the case of $\alpha*\beta \geq 0$, and substituting the selected and received value in the mathematical expression (J) with the received value that is not selected in the mathematical expression (J) in the case of $\alpha*\beta<0$, where in the mathematical expression (J), ① if $2^n-2^{n(2-m)} \leq |\Omega| \leq 2^n-2^{n(2-m)}+1$, the output is determined as $a*(-1)^m$, also, ② if $2^{n-1}-1 \leq |\Omega| \leq 2^{n-1}+1$, the output is determined as $a*0.9375(|\Omega|-2^{n-1})$, also, ③ if $2^{n-1}-2^{(n-1)(2-m)}+m \leq |\Omega| \leq 2^n-2^{(n-1)(2-m)}+m-2$, the output is determined as $$a*\left[\frac{0.0625}{2^n-2}(|\Omega|-2m+1)+0.9735(-1)^m-0.0625\right],$$

where Ω is a selected and received value, 'a' is an arbitrary real number set according to a desired output scope, α is a received value of 1 (real number) channel, β is a received value of Q (imaginary number), and m=1, 2.

18. The method according to claim 1, wherein when the magnitude of QAM is less than 64-QAM, a fourth conditional probability vector is calculated by substituting each of received values used with each of the received values that are not used in the method for obtaining a third conditional probability vector in the cases of $\alpha*\beta \geq 0$ and $\alpha*\beta<0$.

19. The method according to claim 1, wherein when the magnitude of QAM is 64-QAM, a fifth conditional probability vector is determined by selecting one of the received values α and β according to the form of a combination constellation diagram, and using the following mathematical expression (K) in the case of $\alpha*\beta \geq 0$, and substituting the received value selected in the mathematical expression (K) with the received value that is not selected in the expression in the case of $\alpha*\beta<0$, where in the mathematical expression (K), ① if $m*2^{n-1}-1 \leq |\Omega| \leq m*2^{n-1}+1$, the output is determined as $a*(-1)^{m+1}$, also, ② if $(2l-1)*2^{n-1}-1<|\Omega| \leq (2l-1)$ $*2^{n-1}+1$, the output is determined as $a*(-1)^{l+1}\{0.9375|\beta|-0.9375(2l-1)*2^{n-1}\}$, where $\Omega$ is a selected and received value, 'a' is an arbitrary real number set according to a desired output scope, $\alpha$ is a received value of I (real number) channel, $\beta$ is a received value of Q (imaginary number) channel, m=0, 1, 2, and l=1, 2.

20. The method according to claim 1, wherein when the magnitude of QAM is 64-QAM, a sixth conditional probability vector is calculated by substituting each of received values used with each of the received values that are not used in a method for obtaining a fifth conditional probability vector of the second form in the cases of $\alpha*\beta\geq0$ and $\alpha*\beta<0$.

21. The method according to claim 1, wherein when the magnitude of QAM is more than 256-QAM, fourth to $n^{th}$ conditional probability vectors are determined by selecting one of the received values $\alpha$ and $\beta$ according to the form of a combination constellation diagram, using the following mathematical expression (L) in the case of $\alpha*\beta\geq0$, and substituting the received value selected in the mathematical expression (L) with the received value that is not selected in the expression in the case of $\alpha*\beta<0$, where in the mathematical expression (L), ⓐ if $m*2^{n-k+3}-1<|\Omega|\leq m*2^{n-k+3}+1$, the output is determined as $a*(-1)^{m+1}$, also, ⓑ if $(2l-1)*2^{n-k+2}-1<|\Omega|\leq(2l-1)*2^{n-k+2}+1$, the output is determined as $a*(-1)^{l+1}\{0.9375(|\Omega|-0.9375(2l-1)*2^{n-k+2})$, also, ⓒ if $(P-1)*2^{n-k+2}+1<|\Omega|\leq P*2^{n-k+2}-1$, when P is an odd number, the output is determined as $$a*\left[\frac{0.0625}{2^{n-K+2}-2}[(-1)^{(p+1)/2+1}*|\Omega|+(-1)^{(p+1)/2}[(P-1)*2^{n-k+2}+1]]+(-1)^{(p+1)/2}\right],$$

when P is an even number, the output is determined as $$a*\left[\frac{0.0625}{2^{n-k+1}-2}[(-1)^{p/2+1}*|\Omega|+(-1)^{p/2}(P*2^{n-k+2}-1)]+(-1)^{p/2+1}\right],$$

where k is conditional probability vector numbers (4, 5, ..., n), $\Omega$ is a selected and received value, 'a' is an arbitrary real number set according to a desired output scope, $\alpha$ is a received value of I (real number) channel, $\beta$ is a received value of Q (imaginary number) channel, m=0, 1, ... $2^{k-3}$, l is 1, 2, ... $3^{k-3}$, and p=1, 2 ..., $2^{k-2}$.

22. The method according to claim 21, wherein when the magnitude of QAM is more than 256-QAM, a method for obtaining an $(n+2)^{th}$ conditional probability vector is the same as the method for obtaining the fourth conditional probability vector in the case that the magnitude of QAM of the second form is less than 256-QAM.

23. The method according to claim 21, wherein when the magnitude of QAM is more than 256-QAM, $(n+3)^{th}$ to $(2n-1)^{th}$ conditional probability vectors are calculated by substituting each of received values used with each of the received values that are not used when determining the fourth to $n^{th}$ conditional probability vectors in the cases of $\alpha*\beta\geq0$ and $\alpha*\beta<0$ when the magnitude of QAM of the second form is more than 256-QAM.

24. The method according to claim 21, wherein when the magnitude of QAM is more than 256-QAM, a $2n^{th}$ conditional probability vector is calculated by substituting each of the received values used with each of the received values that are not used when determining the fourth to the $(n+1)^{th}$ conditional probability vectors in the cases of $\alpha*\beta\geq0$ and $\alpha*\beta<0$ when the magnitude of QAM of the second form is more than 256-QAM.

25. The method according to claim 1, wherein when the magnitude of QAM is more than 256-QAM, $(n+1)^{th}$ conditional probability vectors are determined using the following mathematical expression (M) in the case of $\alpha*\beta\geq0$, and substituting the received value selected in the mathematical expression (M) with the received value that is not selected in the expression in the case of $\alpha*\beta<0$, where in the mathematical expression (M), ⓐ if $m*2^2-1\leq|\Omega|\leq m*2^2+1$, the output is determined as $a*(-1)^{m+1}$, also, ⓑ if $(2l-1)*2^1-1<|\Omega|\leq(2l-1)*2^1+1$, the output is determined as $a*(-1)^{l+1}\{0.9375\{(|\Omega|-0.9375(2l-1)*2^1)$, where $\Omega$ is a selected and received value, 'a' is an arbitrary real number set according to a desired output scope, $\alpha$ is a received value of I (real number) channel, $\beta$ is a received value of Q (imaginary number) channel, m=0, 1, ... $2^{k-2}$, and l is 1, 2, ... $3^{k-2}$.

26. A soft decision method for demodulating a received signal $\alpha+\beta i$ of a square Quadrature Amplitude Modulation (QAM) consisting of an in-phase signal component and a quadrature phase signal component, comprising:

receiving the signal $\alpha+\beta i$ in a radio communication apparatus;

obtaining a plurality of conditional probability vector values, each being a soft decision value corresponding to a bit position of a hard decision, using a function including a conditional determination operation from the quadrature phase component and the in-phase component of the received signal, wherein a first conditional probability vector decision method for demodulating a first half of a total number of bits is the same as a second conditional probability vector decision method for demodulating a second half of the bits, and is determined by substituting a quadrature phase component value and an in-phase component value with each other, wherein the demodulate signal has 2n bits, wherein the conditional probability vector values corresponding to the first bit to $n^{th}$ bit of the first half are demodulated by one of the received signal components $\alpha$ and $\beta$, and the conditional probability vector values corresponding to the $(n+1)^{th}$ to $2n^{th}$ bits of the second half are demodulated by the remaining one of the received signal components $\alpha$ and $\beta$, and an equation applied for the two demodulations is the same in the first half and the second half, and wherein a first conditional probability vector is determined by selecting one of the received signal components $\alpha$ and $\beta$ according to a combination constellation diagram and applying the following mathematical expression, where ① an output value is unconditionally determined as $$\frac{a}{2^n}\Omega,$$

where $\Omega$ is a selected and received value which is one of $\alpha$ and $\beta$, and $\alpha$ is an arbitrary real number set according to a desired output scope.

27. A soft decision method for demodulating a received signal α+βi of a square Quadrature Amplitude Modulation (QAM) consisting of an in-phase signal component and a quadrature phase signal component, comprising:
receiving the signal α+βi in a radio communication apparatus;
obtaining a plurality of conditional probability vector values, each being a soft decision value corresponding to a bit position of a hard decision, using a function including a conditional determination operation from the quadrature phase component and the in-phase component of the received signal,
wherein a conditional probability vector decision method for demodulating a first half of a total number of bits is the same as a decision method for demodulating the remaining half of the bits, and is determined by substituting a quadrature phase component value and an in-phase component value with each other,
wherein the demodulate signal has 2n bits,
wherein the conditional probability vector values corresponding to the first bit to $n^{th}$ bit of the first half are demodulated by one of the received signal components α and β, and the conditional probability vector values corresponding to the $(n+1)^{th}$ to $2n^{th}$ bits of the second half are demodulated by the remaining one of the signal components α and β, and an equation applied for the two demodulations is the same in the first half and the second half, and
wherein a second conditional probability vector is determined by the received value selected when determining a first conditional probability vector and by employing the following mathematical expression,
where an output value is unconditionally determined as $$a\left(c - \frac{c}{2^{n-1}}|\Omega|\right),$$

where $\Omega$ is a selected and received value, n is a magnitude of the QAM, that is, a parameter used to determine $2^{2n}$, a is an arbitrary real number set according to a desired output scope, and c is an arbitrary constant.

28. A soft decision method for demodulating a received signal α+βi of a square Quadrature Amplitude Modulation (QAM) consisting of an in-phase signal component and a quadrature phase signal component, comprising:
receiving the signal α+βi in a radio communication apparatus;
obtaining a plurality of conditional probability vector values, each being a soft decision value corresponding to a bit position of a hard decision, using a function including a conditional determination operation from the quadrature phase component and the in-phase component of the received signal,
wherein a conditional probability vector decision method for demodulating a first half of a total number of bits is the same as a decision method for demodulating the remaining half of the bits, and is determined by substituting a quadrature phase component value and an in-phase component value with each other,
wherein the demodulate signal has 2n bits,
wherein the conditional probability vector values corresponding to the first bit to $n^{th}$ bit of the first half are demodulated by one of the received signal components α and β, and the conditional probability vector values corresponding to the $(n+1)^{th}$ to $2n^{th}$ bits of the second half are demodulated by the remaining one of the signal components α and β, and an equation applied for the two demodulations is the same in the first half and the second half, and
wherein third to $n^{th}$ conditional probability vectors are determined by a received value set when determining a first conditional probability vector and employing the following mathematical expression (A),
where in the mathematical expression (A),
first, dividing an output diagram in a shape of a basic V form, wherein conditional probability vector corresponding to each bit is divided into $(2^{k-3}+1)$ areas,
determining a basic expression according to $$a\left(\frac{d}{2^{n-k+1}}|\Omega| - d\right)$$

determining an output finding an involved area using a given $\Omega$ and substituting a value of $(|\Omega|-m)$ such that a middle value is subtracted from each area into the basic expression as a new $\Omega$, and
rendering the middle value as $m=2^n$ and substituting the value of $(|\Omega|-m)$ into the basic expression as a new $\Omega$ in an area that is in the most outer left and right sides among the divided areas, that is, $(2^{k-2}-1)2^{n-k+2}<|\Omega|$, where $\Omega$ is a selected and received value, n is a magnitude of the QAM, that is, a parameter used to determine $2^{2n}$, k is conditional probability vector number (k=3, 4, . . . , n), d is a constant that changes according to the value of k, and a is a constant determining an output scope.

29. The method according to claim 28, wherein the $(n+1)^{th}$ to $2n^{th}$ conditional probability vectors are sequentially obtained using one of the received values of α and β that is not selected when the first conditional probability vector is determined and the mathematical expressions described above, except that the number k of the conditional probability vector included in the mathematical expression (A) sequentially substitutes 3 to n with n+1 to 2n).

* * * * *